(12) United States Patent
Takeuchi et al.

(10) Patent No.: US 8,254,216 B2
(45) Date of Patent: Aug. 28, 2012

(54) CONTENT DUBBING SYSTEM, CONTENT RECORDING APPARATUS AND CONTENT DUBBING METHOD

(75) Inventors: Kazuma Takeuchi, Kanagawa (JP); Yoshiaki Iwata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/122,812

(22) PCT Filed: Jul. 16, 2010

(86) PCT No.: PCT/JP2010/004622
§ 371 (c)(1),
(2), (4) Date: Apr. 6, 2011

(87) PCT Pub. No.: WO2011/016191
PCT Pub. Date: Feb. 10, 2011

(65) Prior Publication Data
US 2011/0194204 A1 Aug. 11, 2011

(30) Foreign Application Priority Data
Aug. 6, 2009 (JP) .................................. 2009-182997

(51) Int. Cl.
*G11B 21/08* (2006.01)
(52) U.S. Cl. ....................................... 369/30.05; 369/84
(58) Field of Classification Search ........................ None
See application file for complete search history.

(56) References Cited

U.S. PATENT DOCUMENTS

| 6,993,567 | B1 * | 1/2006 | Yodo et al. ..................... 709/217 |
| 7,366,733 | B2 * | 4/2008 | Matsumi et al. .............. 707/821 |
| 2005/0285884 | A1 | 12/2005 | Suda | |
| 2006/0126471 | A1 * | 6/2006 | Tomonari et al. ............ 369/53.2 |
| 2008/0232781 | A1 | 9/2008 | Ohizumi et al. | |
| 2010/0017571 | A1 | 1/2010 | Nakaji et al. | |

FOREIGN PATENT DOCUMENTS

| JP | 2000-207138 | 7/2000 |
| JP | 2005-158197 | 6/2005 |
| JP | 2005-223687 | 8/2005 |
| JP | 2006-14243 | 1/2006 |
| JP | 2006-319728 | 11/2006 |
| JP | 2008-85851 | 4/2008 |

OTHER PUBLICATIONS

International Search Report issued Oct. 12, 2010 in International (PCT) Application No. PCT/JP2010/004622.

* cited by examiner

*Primary Examiner* — Paul Huber
(74) *Attorney, Agent, or Firm* — Wenderoth, Lind & Ponack, L.L.P.

(57) ABSTRACT

The content copying system pertaining to the present invention is a content copying system in which multiple devices (11-14) cooperate to copy content to a removable recording medium (31). The first device (11) comprises a writing unit for writing first management data which includes content identifiers (hash1~hash4) to the removable recording medium (31). A second device (12) storing content pieces (ep2, ep4) copies content pieces (ep2, ep4) corresponding to the content identifiers (hash2, hash4) included in the first management data to the removable recording medium (31). Another second device (13) which has a content piece (ep3) stored thereon copies, to the removable recording medium (31), the content piece (ep3) corresponding to the content identifier (hash 3) written to the removable recording medium (31).

15 Claims, 19 Drawing Sheets

45a

Choose contents to copy and playback order

| Playback order | Title | Episode Number | Content ID |
|---|---|---|---|
| 1 | ... | Episode 1 | 00001 |
| 2 | ... | Episode 2 | 00024 |
| 3 | ... | Episode 3 | 00004 |
| 4 | ... | Episode 4 | 00025 |

Copying of "Episode 1 of ⋯" has been completed

Insert disc to apparatuses indicated
below to continue copying

| Name of apparatus | Content to be copied |
|---|---|
| Content recording apparatus 12 | Episode 2 of ⋯ |
| | Episode 4 of ⋯ |
| Content recording apparatus 14 | Episode 3 of ⋯ |

CONTENT DUBBING SYSTEM, CONTENT RECORDING APPARATUS AND CONTENT DUBBING METHOD

This application is a 371 of PCT/JP2010/004622, filed Jul. 16, 2010.

TECHNICAL FIELD

The present invention relates to a technology of copying content to removable recording media, especially to copying of content pieces which are distributed among multiple devices to a removable recording medium.

BACKGROUND ART

Some conventional content recording apparatuses are capable of recording contents such as TV programs to a built-in HDD (Hard Disk Drive), and copying the recorded contents onto removable media such as optical discs. Examples of such apparatuses include Blu-ray recorders equipped with an HDD and the like.

In the mean time, implementation of in-home networks such as certified by the DLNA (Digital Living Network Alliance) is rapidly in progress. The implementation of such in-home networks enables multiple devices within a household to connect with each other.

Further, establishment of such in-home networks enables contents stored onto one device to be obtained and played back on another device over the network.

In addition, by utilizing such in-home networks, a user can cause one device over the network to perform SRS (Scheduled Recording Service) of TV programs by providing instructions on another device.

Patent Literature 1 discloses a technology adopted in a playback device to download, according to management data of an original AV data stored onto an optical disc, data (i.e. subtitles) related to the original AV data, via a server, while playing back the original AV data.

CITATION LIST

[Patent Literature]
[Patent Literature 1]
Japanese Patent Application Publication No. 2005-158197

SUMMARY OF INVENTION

Technical Problem

The aforementioned rapid and widespread implementation of in-home networks has given rise to a problematic situation where a large number of contents are recorded and stored onto multiple devices included in the in-home network.

In such a situation, a user (especially a user who is not accustomed to using content recording apparatuses) will experience difficulty figuring out the correlation between each of the devices included in the network and the contents stored thereon. Accordingly, when attempting to copy a certain content piece to an optical disc, the user will have difficulty determining on which device the content piece is recorded.

The present invention has been achieved in view of the above problems, and an aim thereof is to provide a content copying system which facilitates copying of designated contents to removable recording media, in the situation where contents are distributed among multiple devices.

Solution to Problem

In order to solve the aforementioned problems, the present invention provides a content copying system including a plurality of devices cooperating to copy a content piece to a removable recording medium, the plurality of devices including a first device and a second device, the first device comprising: a creation unit operable to create a content list, the content list being a list of a plurality of content pieces held by the plurality of devices in the content copying system; a reception unit operable to receive, from a user, a designation of at least one content piece to be copied to the removable recoding medium from among the content pieces listed in the content list; an obtaining unit operable to obtain at least one content identifier in one-to-one correspondence with the at least one content piece to be copied from the plurality of devices; and a writing unit operable to write first management data to the removable recording medium, the first management data including the at least one content identifier obtained by the obtaining unit, and the second device comprising: a storing unit operable to store at least one content piece; a generation unit operable to generate at least one content identifier in one-to-one correspondence with the at least one content piece stored in the storing unit; a reading unit operable to read the at least one content identifier included in the first management data from the removable recording medium; a judging unit operable to judge whether the at least one content identifier generated by the generation unit is included in the at least one content identifier read from the removable recording medium; and an additional writing unit operable, when a content identifier generated by the generation unit is included in the at least one content identifier read from the removable recording medium, to copy a content piece corresponding to the content identifier to the removable recording medium.

ADVANTAGEOUS EFFECTS OF INVENTION

According to the above-mentioned structure of the content copying system pertaining to the present invention, the first device writes, onto the recording medium, content identifiers in one-to-one correspondence with the content pieces to be copied. Hence, the second device is capable of additionally writing content pieces onto the recording medium by referring to the content identifiers written on the recording medium. Thus copying of content pieces to the recording medium is facilitated.

BRIEF DESCRIPTION OF DRAWINGS

FIG. 12 is a diagram showing an example of a menu screen displaying copy results.

FIG. 16 is a functional block diagram of a content recording apparatus 12a.

DESCRIPTION OF EMBODIMENTS

In the following, description will be made on an embodiment of the present invention, with reference to the accompanying figures.

[First Embodiment]

Figure 1:
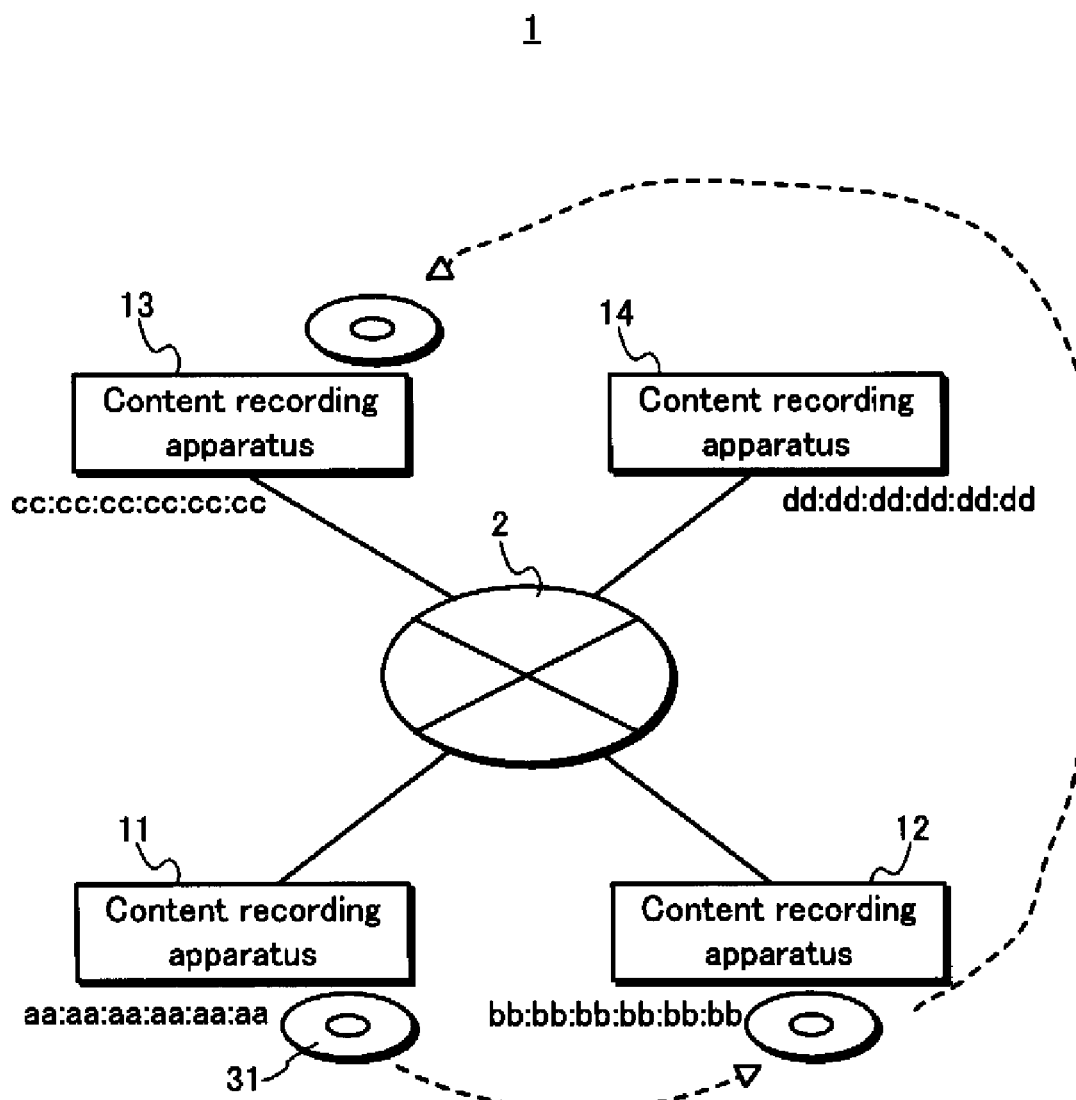
FIG. 1 is a diagram showing an overall structure of a content copying system 1.

FIG. 1 is a diagram showing an overall structure of a content copying system 1.

The content copying system 1 includes four content recording apparatuses: a content recording apparatus 11, a content recording apparatus 12, a content recording apparatus 13, and a content recording apparatus 14. The content recording apparatuses 11 through 14 are connected with each other via a network 2. The character strings in FIG. 1, for instance "aa:aa:aa:aa:aa:aa", which are arranged next to the blocks indicating the content recording apparatuses indicate the MAC (Media Access Control) addresses of the apparatuses.

Each of the content recording apparatuses 11 through 14 has functions equivalent to those of a common Blu-ray recorder equipped with an HDD. More specifically, each of the content recording apparatuses 11 through 14 is capable of receiving contents such as TV programs, recording the contents received to an internal HDD, and playing back the contents recorded thereon. In addition, each of the content recording apparatuses is equipped with an optical drive, whereby each of the content recording apparatuses is capable of copying contents recorded (stored) onto the internal HDD to an optical disc 31 inserted thereto. Hereinafter, unless mentioned otherwise, an "optical disc" refers to a BD-RE (Blu-ray Disc Rewritable) disc.

Further, the content recording apparatuses 11 through 14, which are in compliance with the DLNA guideline, are capable of transmitting and receiving various forms of information to and from each other via the network 2.

In the content copying system 1, a large number of content pieces are distributed to the internal HDDs of the content recording apparatuses 11 through 14. In this embodiment, description is made on a case where the content recording apparatuses 11 through 14 copy designated content pieces stored on the HDDs thereof to a single optical disc 31 in a cooperative manner.

In the example in FIG. 1, each designated content piece is one episode of a weekly-broadcasted TV series, and here, consecutive episodes 1 through 4 have been recorded and are stored onto the local HDDs of the content recording apparatuses 11 through 14 in the following correlation.

episode 1: content recording apparatus 11
episodes 2 and 4: content recording apparatus 12
episode 3: content recording apparatus 13

Figure 14:
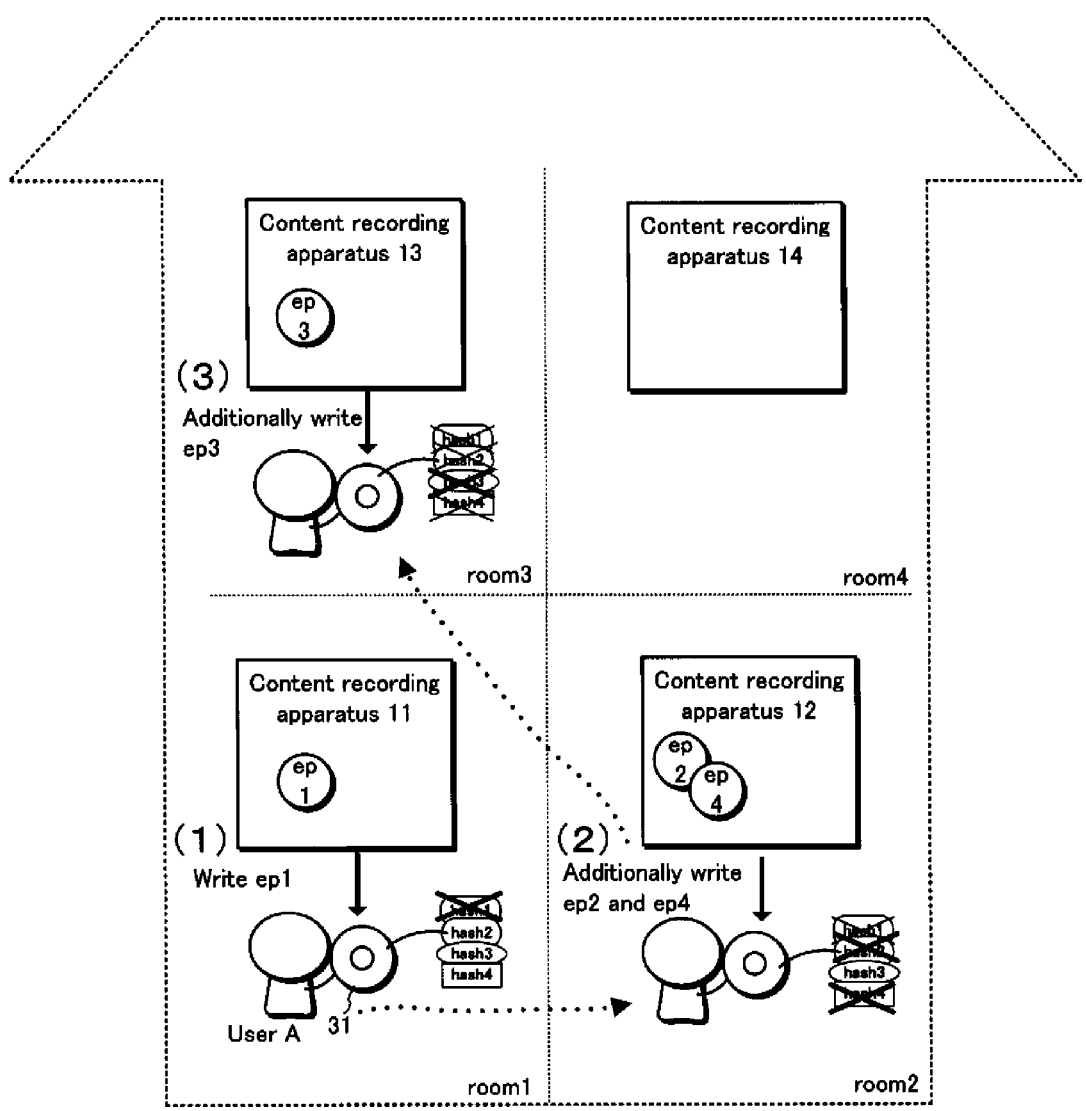
FIG. 14 is a diagram showing how content copying is performed in a case where contents distributed among in-home content recording apparatuses 11 through 14 are copied onto a single optical disc 31.

In such a case, the procedures involved when the user attempts to copy episodes 1 through 4 onto a single optical disc 31, in the correct order in which the episodes are broadcasted, are as follows (refer to FIG. 14).

(1) The content recording apparatus 11 receives, from the user A, a designation of content pieces to be copied: episodes 1 through 4 in this case, and a specification of a playback order in which the copied content pieces are to be played back: episode 1→episode 2→episode 3→episode 4 in this case.

Following receipt of the designation of the content pieces and the specification of the playback order from the user A, the content recording apparatus 11 copies episode 1, which is stored on the local HDD thereof, to the optical disc 31 inserted thereto by the user A ("Initial Writing").

(2) The content recording apparatus 12 copies episodes 2 and 4, which are stored on the local HDD thereof, to the optical disc 31 inserted thereto by the user A ("Additional Writing").

(3) The content recording apparatus 13 copies episode 3, which is stored on the local HDD thereof, to the optical disc 31 inserted thereto by the user A ("Additional writing").

Episodes 1 through 4 are copied to the optical disc 31 by execution of the procedures (1) through (3) as described above.

Note that the content recording apparatus 11 which initially writes the designated content piece also writes additional writing judgment information to the optical disc 31. The additional writing judgment information is information identifying the designated content pieces to be copied to the optical disc 31 in additional writing. More specifically, in additional writing, each of the content recording apparatuses 12 and 13 refers to the additional writing judgment information to specify the designated content pieces to copy onto the optical disc 31 from among the large number of content pieces stored on the local HDD thereof. Details of the additional writing judgment information and the operations involved therewith will be later described.

In addition, the content recording apparatus 13 rewrites and thus updates management data included in the optical disc 31 to management data which is in accord with the playback order specified by the user A. Rewriting and updating of management data in such a manner allows content pieces recorded onto the optical disc 31 to be played back in the order as specified by the user A, irrelevant of the order in which the optical disc 31 is inserted to the content recording apparatuses 11 through 13.

Figure 2:
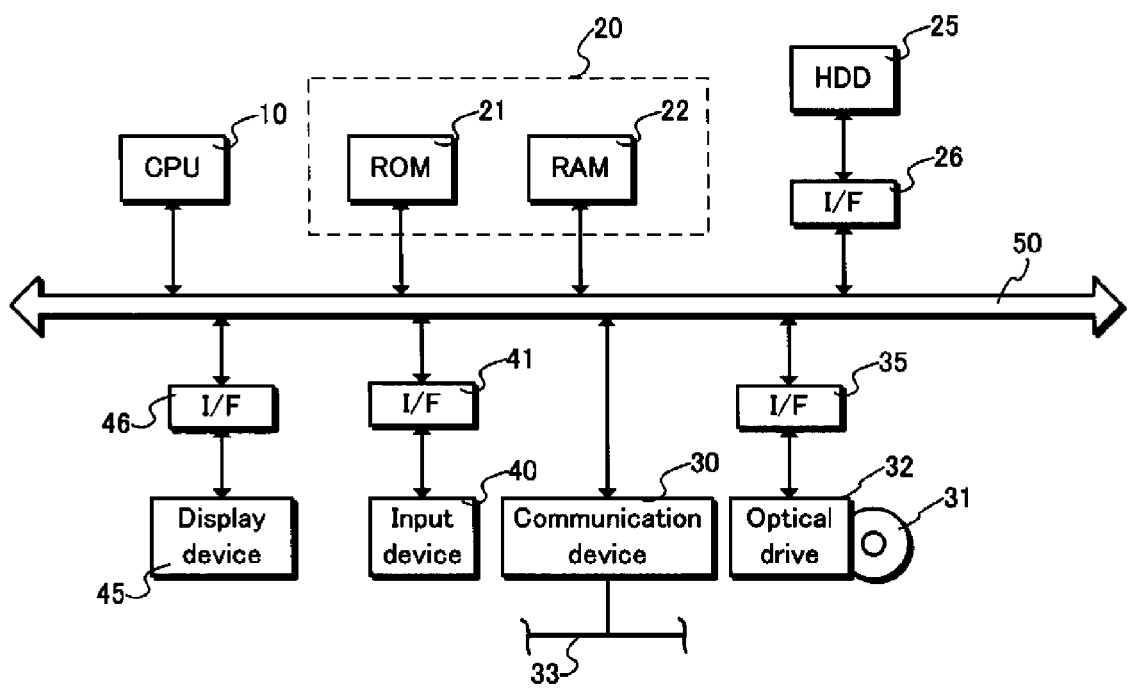
FIG. 2 is a diagram showing the hardware structure of a content recording apparatus 11.

FIG. 2 is a diagram showing the hardware structure of the content recording apparatus 11. Note that, although description being made in FIG. 2 is limited to the content recording apparatus 11, the content recording apparatuses 12, 13 and 14 also have similar hardware structures.

The content recording apparatus 11 includes a CPU (Central Processing Unit) 10, a memory device 20, an HDD 25, a communication device 30, an optical drive 32, an input device 40, and a display device 45.

The devices included in the content recording apparatus 11 are connected to each other via a bus line 50.

The HDD 25, the optical drive 32, the input device 40, and the display device 45 are respectively connected to the bus line 50 via an I/F (interface) 26, an I/F 35, an I/F 41, and an I/F 46.

The CPU 10 may either be composed of a single CPU or multiple CPUs. In the example depicted in FIG. 2, the CPU 10 is composed of a single CPU.

The memory device 20 includes a ROM (Read Only Memory) 21 and a RAM (Random Access Memory) 22.

The ROM 21 is provided with a computer program prescribing the operations of the CPU 10 and data related thereto. Note that the computer program and the related data may be stored onto the HDD 25 instead.

The ROM 21 is to be composed of a non-volatile memory, such as a flash memory, which may be written to and which is capable of retaining data even when not powered.

The CPU 10 executes processing as prescribed by the computer program, while writing the computer program and the data stored onto either the ROM 21 or the HDD 25 to the RAM 22 when necessary.

The RAM 22 also functions as a temporary storage medium of data being generated in the execution of processing by the CPU 10.

The HDD 25 stores and retains therein various types of data, including the computer program and content pieces. In detail, each of the content pieces as referred to herein is generated by the content recording apparatus 11 receiving a TV program and further recording the TV program as data.

The optical drive 32 accesses the optical disc 31 so as to write information thereto and read information recorded thereon.

The communication device 30 performs the exchange of computer programs and data with external sources via a communication line 33. The communication line 33 includes such means of communication as a telephone line, a network line, a wireless connection, and an infrared connection.

The input device 40 receives user operations and inputs data and the like to the content recording apparatus 11. The input device may be, for instance, input buttons laid out on an AV device, a keyboard laid out on a PDA, or a removable mouse or keyboard. In addition, the input device 40 may be a remote control device for controlling an AV device, in the case where the bus line 50 is not directly connected thereto.

The display device 45 outputs reproduced images, videos, and audios, and is composed of such devices as an LCD (Liquid Crystal Display), or a Cathode ray tube display. The display device may also include a speaker.

In the following, description will be made on the functional structure of the content recording apparatus 11 (the initial writing apparatus) which performs initial writing of designated content pieces to the optical disc, with reference to the accompanying FIG. 3. Additionally, description will be also made on the functional structure of the content recording apparatuses 12, 13, and 14 (the additional writing apparatuses) which perform additional writing of designated content pieces to the optical disc, with reference to the accompanying FIG. 4.

<Initial Writing Apparatus>

Figure 3:
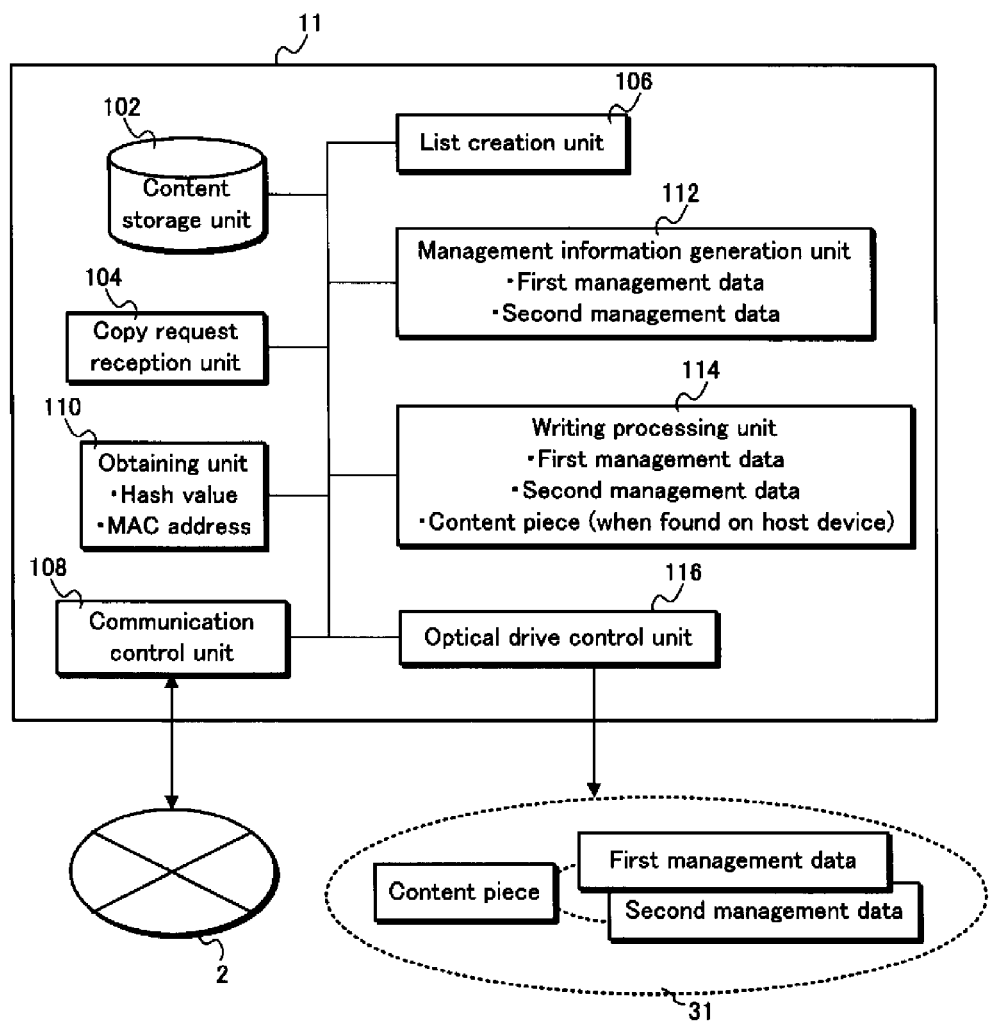
FIG. 3 is a functional block diagram of the content recording apparatus 11.

FIG. 3 is a functional block diagram of the content recording apparatus 11.

The content recording apparatus 11 includes a content storage unit 102, a copy request reception unit 104, a list creation unit 106, a communication control unit 108, an obtaining unit 110, a management data generation unit 112, a writing processing unit 114, and an optical drive control unit 116.

The content storage unit 102 is composed of the HDD 25 and stores content pieces therein.

The list creation unit 106 creates a list of all content pieces existing on the network 2 (more specifically, all content pieces stored on the content recording apparatuses 11 through 14), by obtaining a list of content pieces from each of the content recording apparatuses 12 through 14. The list creation unit 106 obtains a list from each of the content recording apparatuses 12 through 14 via the communication control unit 108.

Figure 5:
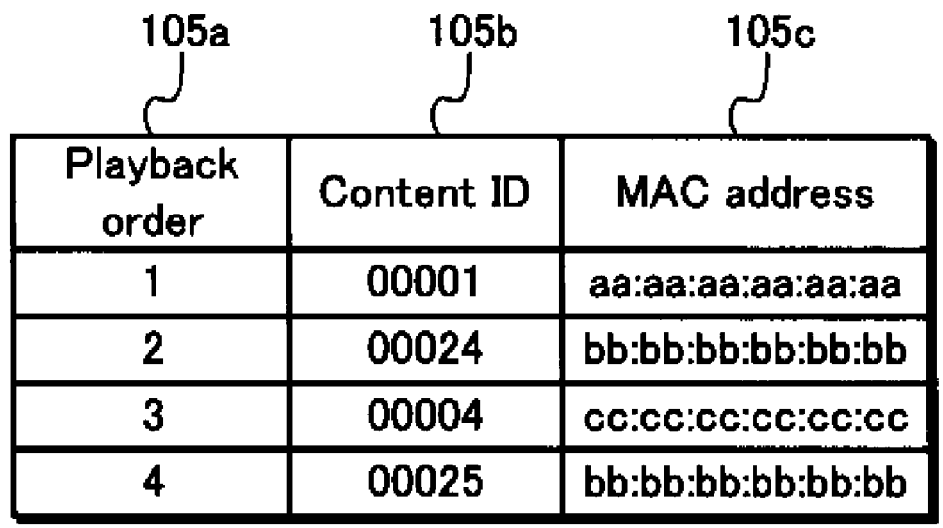
FIG. 5 is a diagram showing an example of playback order information.

The copy request reception unit 104 displays a menu which includes the list created by the list creation unit 106 on the display device 45, and receives a designation of content pieces to be copied and a specification of playback order from the user via the input device 40. FIG. 5 shows an example of playback order information which indicates the copy request made by the user. The playback order information 105 includes (1) the playback order 105a received from the user, (2) a content ID 105b uniquely identifying a content piece, and (3) a MAC address 105c indicating the content recording apparatus storing the content piece identified by the content ID. The copy request reception unit 104 transmits the playback order information 105 to the management data generation unit 112.

The MAC addresses are obtained, for instance, by the communication control unit 108 sending a request compliant with the ARP protocol (Address Resolution Protocol) to each of the other content recording apparatuses 12 through 14.

The communication control unit 108 includes the communication device 30, and controls the transmission and reception of information to and from the network 2.

The obtaining unit 110 obtains, from the other devices, such information as hash values in one-to-one correspondence with the designated content pieces, designation of which have been made through the copy request reception unit 104, and the MAC addresses of the content recording apparatuses in hold of each of the designated content pieces.

The management data generation unit 112 generates first management data and second management data. The generation of the first and second management data is performed according to such information as the playback order information (refer to FIG. 5) received from the copy request reception unit 104 and the additional writing judgment information. The additional writing judgment information is information including combinations of a hash value and a MAC address, both of which are obtained by the obtaining unit 110.

The first management data includes the additional writing judgment information and is used throughout the sequence of processing until copying is finally completed. When copying of designated content pieces is finally completed, the first management data is to be replaced by the second management data.

In contrast, the second management data, while not including the additional writing judgment information, includes a PLAYLIST table which is in accord with the playback order received by the copy request reception unit 104. Detailed description will be made on the first and second management data in the following.

The writing processing unit 114 writes data to the optical disc 31 via the optical drive control unit 116.

More specifically, when a content piece included in the designation received by the copy request reception unit 104 is stored on the content storage unit 102, the writing processing unit 114 writes the content piece to the optical disc 31.

In addition to writing the content piece to the optical disc 31, the writing processing unit 114 writes the first management data and the second management data, both of which are generated by the management data generation unit 112 to the optical disc 31.

The optical drive control unit 116 controls the movements of the optical pickup head of the optical drive 32 as well as controlling the opening/closing of the disc tray.

<Additional Writing Apparatus>

Figure 4:
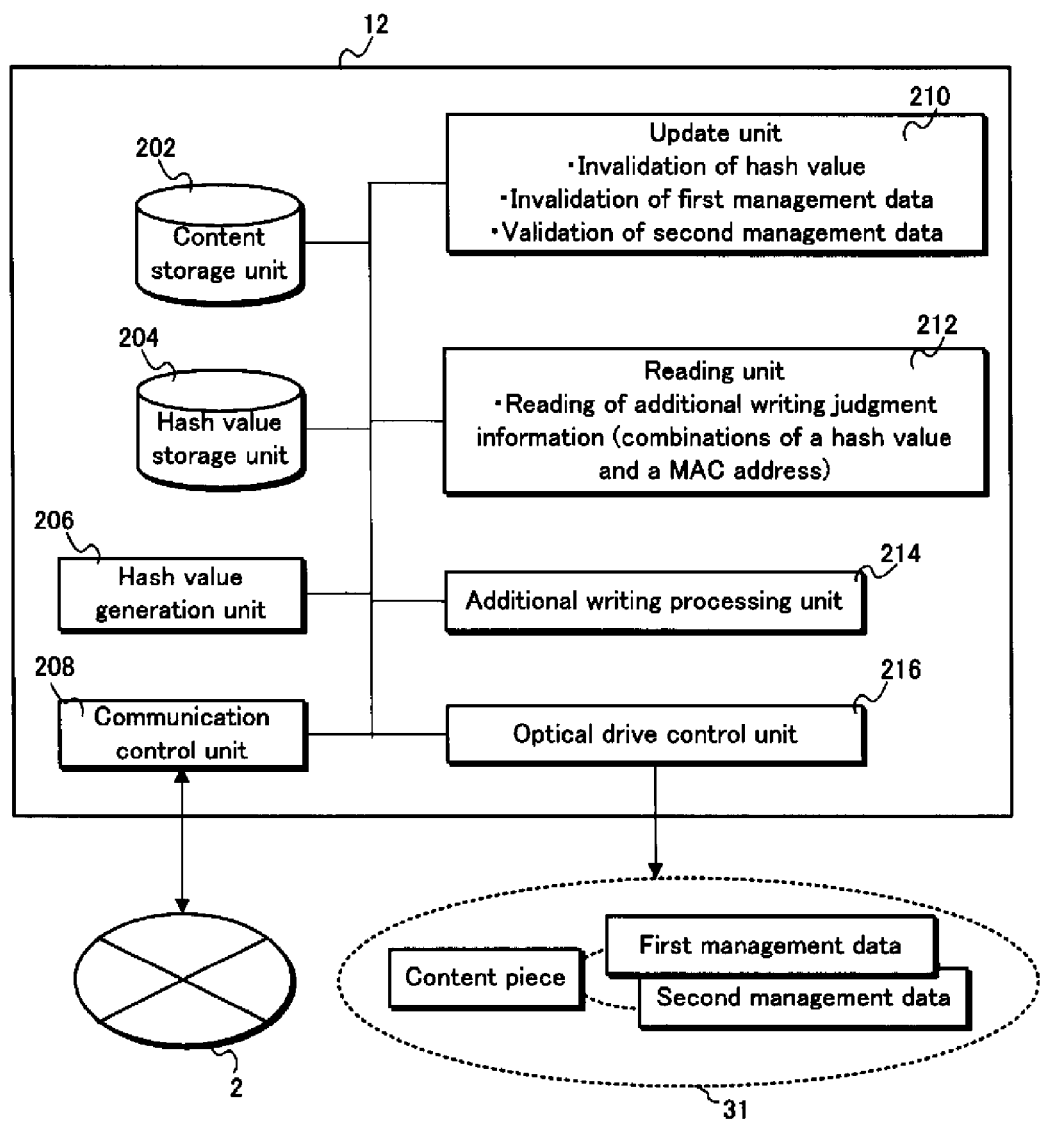
FIG. 4 is a functional block diagram of a content recording apparatus 12.

FIG. 4 is a functional block diagram of the content recording apparatus 12. Although description made in FIG. 4 is limited to the content recording apparatus 12, the content recording apparatuses 13 and 14 also have similar functional block structures.

The content recording apparatus 12 includes a content storage unit 202, a hash value storage unit 204, a hash value generation unit 206, a communication control unit 208, an update unit 210, a reading unit 212, an additional writing processing unit 214, and an optical drive control unit 216.

The content storage unit 202 is composed of the HDD 25 and stores content pieces therein.

The hash value generation unit 206 generates a hash value for each of the content pieces stored in the content storage unit 202. A hash value is generated according to the metadata (including such information as format, frame rate, resolution, playback section information, author, and title) of a content piece. Further, the hash value generation unit 206 stores the generated hash value to the hash value storage unit 204 in association with the content ID of the content piece used for the generation thereof.

Note that the hash function applied in the generation of the hash value by the hash value generation unit 206 is, for instance, the SHA (Secure Hash Algorithm) algorithm or the MD5 (Message Digest Algorithm 5) algorithm.

The communication control unit 208 includes the communication device 30, and controls transmission and reception of information to and from the network 2.

The reading unit 212 reads the additional writing judgment information (including combinations of a hash value and a MAC address as discussed above) from the optical disc 31 via the optical drive control unit 216.

The additional writing processing unit 214 judges whether a content piece to be additionally copied to the optical disk 31 exists on the content recording apparatus 12. The judgment is made according to the additional writing judgment information (including the combinations of a hash value and a MAC address) read from the optical disc 31. When judging that a content piece to be additionally copied exists, the additional writing processing unit 214 reads the content piece from the content storage unit 202 and further writes the content piece to the optical disc 31 via the optical drive control unit 216.

The update unit 210, as the additional writing processing unit 214, executes additional writing of a content piece to the optical disk 31, invalidates the hash value included in the additional writing judgment information which corresponds to the copied content piece. As description has been made in the above, the additional writing judgment information is written to the optical disc 31.

In addition, the update unit 210 invalidates the first management data and in turn validates the second management data, when judging that all of the hash values included in the additional writing judgment information written to the optical disc 31 are invalidated.

Note that, when the optical disc 31 is a BD-RE (Blu-ray Disc Rewritable) disc, invalidation of management data indicates deletion of management data from the BD-RE disc.

In the same context, when the optical disc 31 is a BD-RE disc, validation of management data includes the two procedures of first changing the file name of the management data to "Info.BDAV", and secondly disposing the "Info.BDAV" file in a topmost folder of the file system on the disc.

Furthermore, the update unit 210, when the additional writing processing unit 214 performs additional writing of a content piece to the optical disc 31, deletes a hash value stored in the hash value storage unit 204 which corresponds to the copied content piece.

The optical drive control unit 216 controls the movements of the optical pickup head of the optical drive 32 as well as controlling the opening/closing of the disc tray.

In the following, description is made on the directory structure of the data stored onto the optical disc 31, with reference to the accompanying FIG. 6.

The BDAV directory existing immediately under the ROOT directory includes an Info.BDAV file and the subdirectories PLAYLIST, CLIPINF, and STREAM. Further, FIG. 6 illustrates an example of a directory structure in a case where three content pieces each respectively having content IDs "0001", "0002", and "0003" are stored on the optical disc 31.

The Info.BDAV file indicates management data.

The PLAYLIST directory stores PLAYLIST files having the file extension ".rpls", for instance "XXXXX.rpls". Each of the PLAYLIST files includes information (playback section information) indicating a section to be played back when a stream indicated by the name of the file is played back.

The CLIPINF directory stores "XXXXX.clpi" files, each of which including information required when playing back a stream indicated by the name of the file.

The STREAM directory stores "XXXXX.m2ts" files, each of which being stream files for playback.

In the following, description is made on the data structure of the first management data with reference to the accompanying FIG. 7. Subsequently, description is made on the data structure of the second management data with reference to the accompanying FIG. 8.

<First Management Data>

Figure 7:
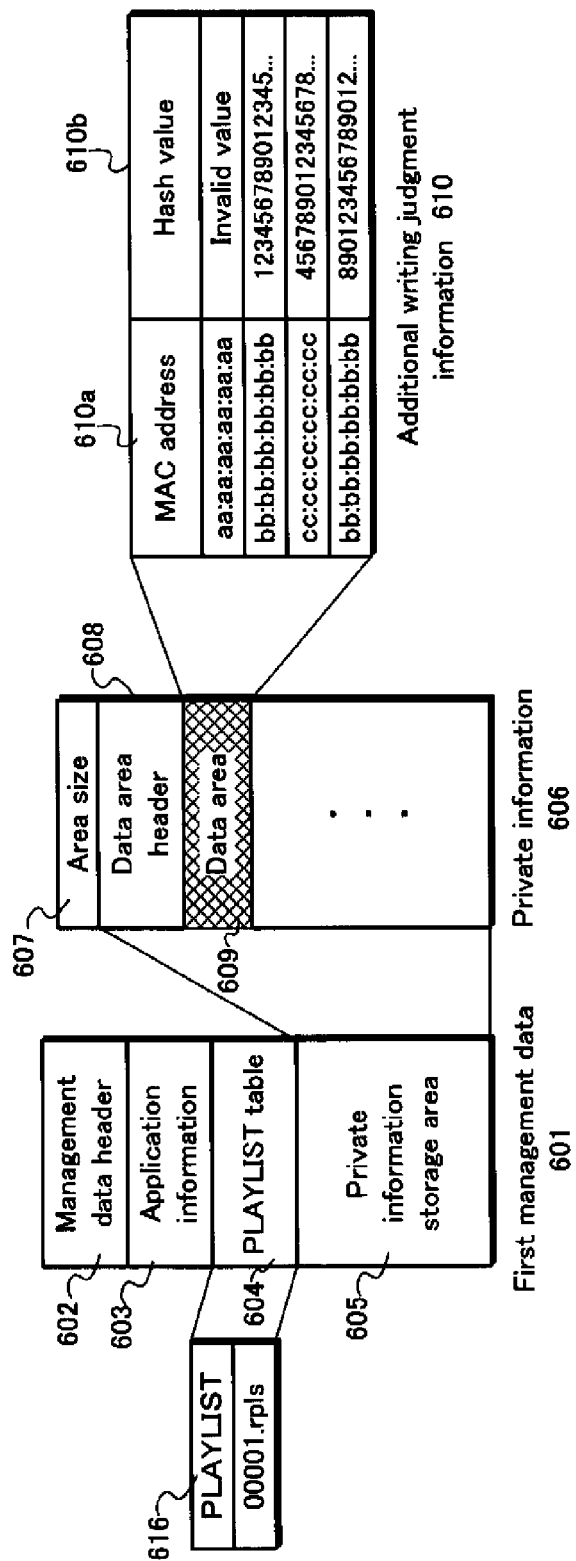
FIG. 7 is a diagram showing the structure of first management data.

As is depicted in FIG. 7, the first management data 601 includes a management data header 602, application information 603, a PLAYLIST table area 604, and a private information storage area 605.

The management data header 602 stores such information as size and version of the first management data 601.

The application information 603 stores information to be accessed by applications during playback of content.

The PLAYLIST table area 604 stores a PLAYLIST table 616. The PLAYLIST table 616 includes names of PLAYLIST files which are available for playback. In the example depicted in FIG. 7, a PLAYLIST file "00001.rpls" is included in the PLAYLIST table 616.

The private information storage area 605 stores private information 606, which is data uniquely defined and provided by the manufacturer of the device.

More specifically, the private information 606 stores combinations of an area size 607, a data area header 608, and a data area 609. Note that in FIG. 7, only one combination from among a plurality of combinations stored in the private information 606 is depicted. Further, the area size 607 indicates the total size of the private information.

The data area header 608 stores an identifier of the information stored in the corresponding data area 609 which is in association therewith.

The data area 609 stores additional writing judgment information 610.

The additional writing judgment information 610 includes combinations of a MAC address 610a and a hash value 610b. In the additional writing judgment information 610, the combinations of the MAC address 610a and the hash value 610b are arranged according to the playback order received by the copy request reception unit 104.

Figure 6:
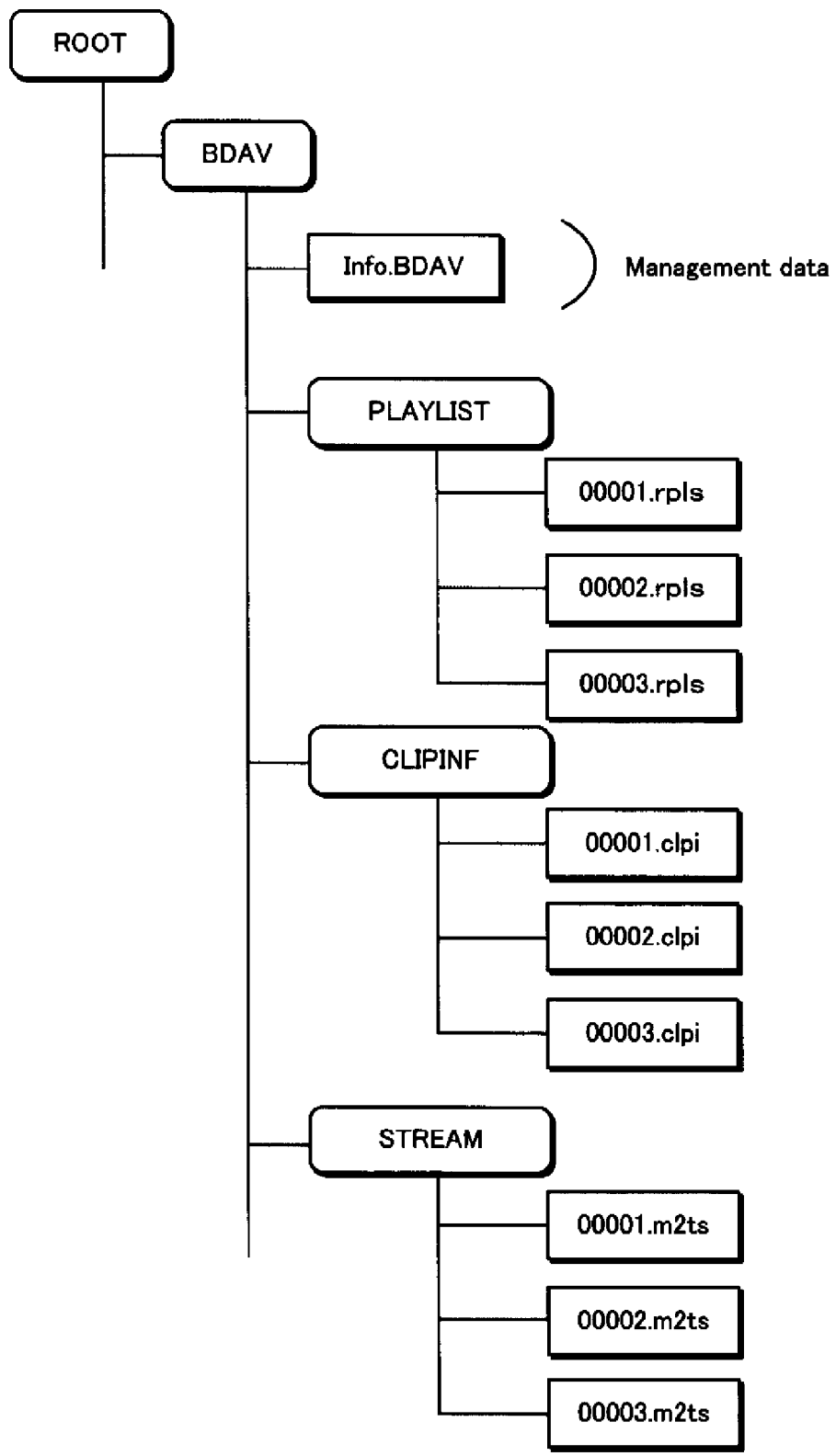
FIG. 6 is a diagram showing the directory structure of data stored onto an optical disc 31.

The first management data 601 having the above-described data structure is generated by the management data generation unit 112 of the content recording apparatus 11, and is written to the optical disc 31 by the writing processing unit 114 as the "Info.BDAV" file (depicted in FIG. 6). Further, the MakersPrivateData included in the "Info.BDAV" file of a BD-RE disc may be used as the data area 609 (user expandable data area) for storing the additional writing judgment information 610.

<Second Management Data>

Figure 8:
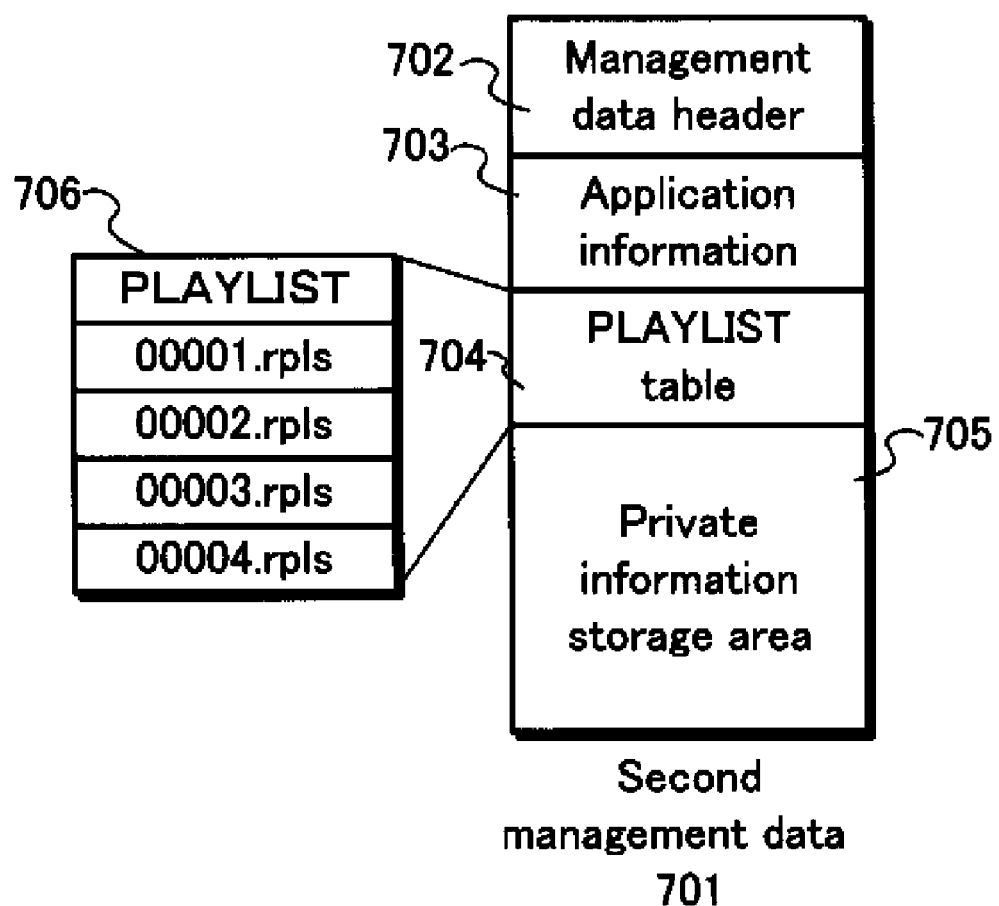
FIG. 8 is a diagram showing the structure of second management data.

As is depicted in FIG. 8, a second management data 701 includes a management data header 702, application information 703, a PLAYLIST table area 704, and a private information storage area 705.

The management data header 702 stores such information as size and version of the second management data 701.

The application information 703 stores information to be accessed by applications during playback of content.

The PLAYLIST table area 704 stores a PLAYLIST table 706. The PLAYLIST table 706 includes names of PLAYLIST files which are to be made available for playback upon completion of copying.

The private information storage area 705 stores data uniquely defined and provided by the manufacturer of the device.

As could be seen from the above, the second management data 701 differs from the first management data 601 in that the second management data 701 does not include additional writing judgment information. Instead, the second management data 701 includes a PLAYLIST table including names of PLAYLIST files, the PLAYLIST files being arranged according to the playback order received by the copy request reception unit 104. Further, as discussed in the following, the second management data 701 is validated when the copying process is completed, and as the second management data 701 is validated, the playback order specified by the PLAYLIST table included therein is validated as well.

In the following, description will be made on processing performed by the initial writing apparatus (in this case, the content recording apparatus 11), with reference to the accompanying FIGS. 9 through 12. Subsequently, description will be made on processing performed by the additional writing apparatus (in this case, each of the content recording apparatuses 12, 13 and 14), with reference to the accompanying FIG. 13.

<Processing Performed by the Initial Writing Apparatus>

Figure 9:
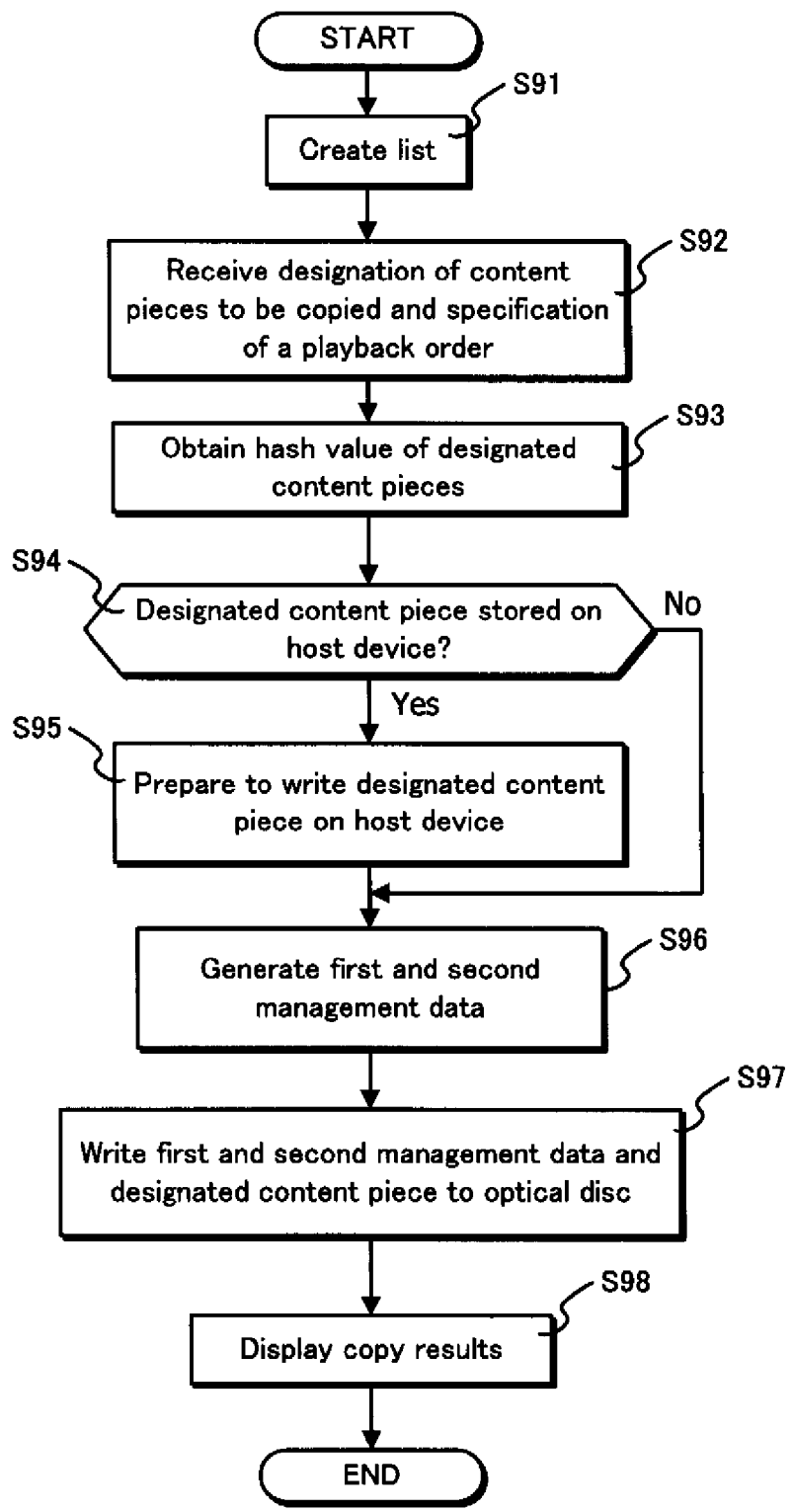
FIG. 9 is a flowchart showing processing performed by an initial writing apparatus.

As is depicted in FIG. 9, the list creation unit 106 of the content recording apparatus 11 creates a list of all content pieces existing on the network 2 (more specifically, all content pieces stored on the content recording apparatuses 11 through 14), by obtaining a list of content pieces from each of the content recording apparatuses 12 through 14, as well as from the content storage unit 102 of the content recording apparatus 11.

The obtaining of a list of content pieces from each of the other devices is performed in such a manner that the list creation unit 106 sends each of the content recording apparatuses 12 through 14 a request for a list of content pieces (S91a), and receives a list of content pieces sent in response to the request from each of the content recording apparatuses (S91b). Such communication between the content recording apparatuses with regard to the lists of content pieces is to be carried out according to a method compliant with the DLNA guideline.

Figure 11:
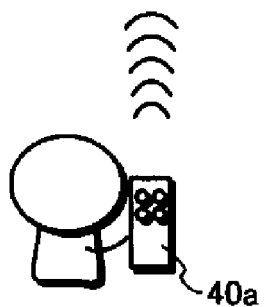
FIG. 11 is a diagram showing an example of a menu screen for receiving a copy request from a user.

The copy request reception unit 104 displays a menu screen including the list of content pieces created by the list creation unit 106 on the display device 45, and receives a designation of content pieces to be copied and a specification of playback order from a user (S92). FIG. 11 is a diagram showing an example of the menu screen to be displayed in Step S92. In the example depicted in FIG. 11, the user is using a remote controller 40a to make operations on a menu screen 45a.

Following receipt of a copy request by the copy request reception unit 104, the obtaining unit 110 obtains hash values from the content recording apparatuses 12 through 14 (S93). Each of the hash values obtained in this step corresponds to a designated content piece held by either one of the content recording apparatuses 12 through 14. Note that obtaining of hash values corresponding to designated content pieces stored in the content storage unit 102 of the content recording apparatus 11 is not included in this step.

In detail, the obtaining of hash values as discussed above is performed such that the obtaining unit 110 of the content recording apparatus 11 sends hash value requests to the other content recording apparatuses (S93a). A hash value request is sent to each of the other content recording apparatuses which is in hold of designated content pieces included in the designation received through the copy request reception unit 104. Each of the other content recording apparatuses, in response to having received a hash value request, generates and transmits one or more hash values to the content recording apparatus 11. The obtaining unit 110 receives the hash values transmitted (S93b).

Figure 10:
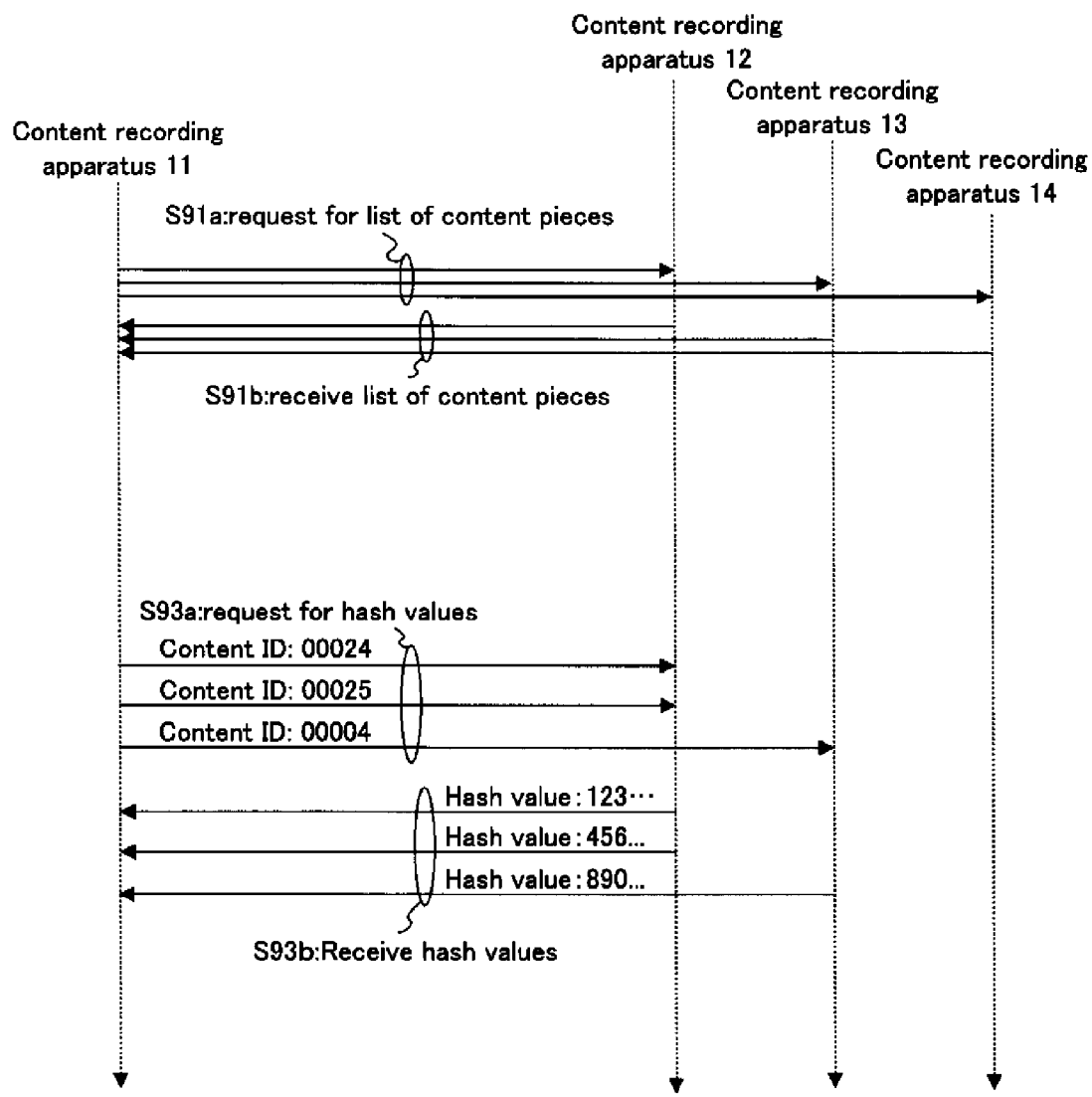
FIG. 10 is a sequential diagram showing processing concerning such information as a content list and a hash value.

In the example depicted in FIG. 10, the content recording apparatus 11 obtains two hash values from the content recording apparatus 12, each of the hash values corresponding to episode 2 (content ID:00024) and episode 4 (content ID: 00025) stored on the content recording apparatus 12. Similarly, the content recording apparatus 11 obtains one hash value from the content recording apparatus 13, the hash value corresponding to episode 3 (content ID; 00004) stored on the content recording apparatus 13.

Following the obtaining of the hash values, the writing processing unit 114 of the content recording apparatus 11 judges whether a designated content piece included in the designation received in Step S92 is stored in the content storage unit 102 (S94). When the result is positive (S94: Yes), the writing processing unit 114 obtains such information as management data and location information corresponding to the designated content piece from the content storage unit 102, and prepares for the subsequent writing process (S95).

The management data generation unit 112 generates the first management data and the second management data (S96).

The first management data includes the additional writing judgment information. The additional writing judgment information includes combinations of a hash value obtained in Step S93 and a MAC address of the apparatus having generated the corresponding hash value. In cases where it is judged that a designated content piece is stored on the content recording apparatus 11 (S94: Yes, S95), the hash value corresponding to the designated content piece stored on the content recording apparatus 11 is invalidated. In the example of the additional writing judgment information as depicted in FIG. 7, since episode 1 was found to be held by the content storage unit 102 of the content recording apparatus 11, the hash value corresponding to episode 1 is invalidated.

The second management data, while not including the additional writing judgment information, includes the PLAY-LIST table which is in accord with the playback order (in this case: episode 1→episode 2→episode 3→episode 4) received through the copy request reception unit 104.

Subsequently, the writing processing unit 114 writes the first management data and the second management data, both of which are generated by the management data generation unit 112, to the optical disc 31. When information has been obtained in S95 corresponding to a designated content piece held by the content storage unit 102, the writing processing unit 114 writes the designated content piece identified by the information to the optical disc 31 as well (S97).

When such writing to the optical disc 31 is completed, the writing processing unit 114 displays a menu screen indicating copy results to the display device 45 (S98). A menu screen 80 as depicted in FIG. 12 includes a message indicating the designated content piece which has been copied to the optical disc 31 and a list of content recording apparatuses in hold of designated content pieces which have not yet been copied to the optical disc 31 and therefore are to be subsequently copied thereto.

<Processing Performed by the Additional Writing Apparatuses>

Figure 13:
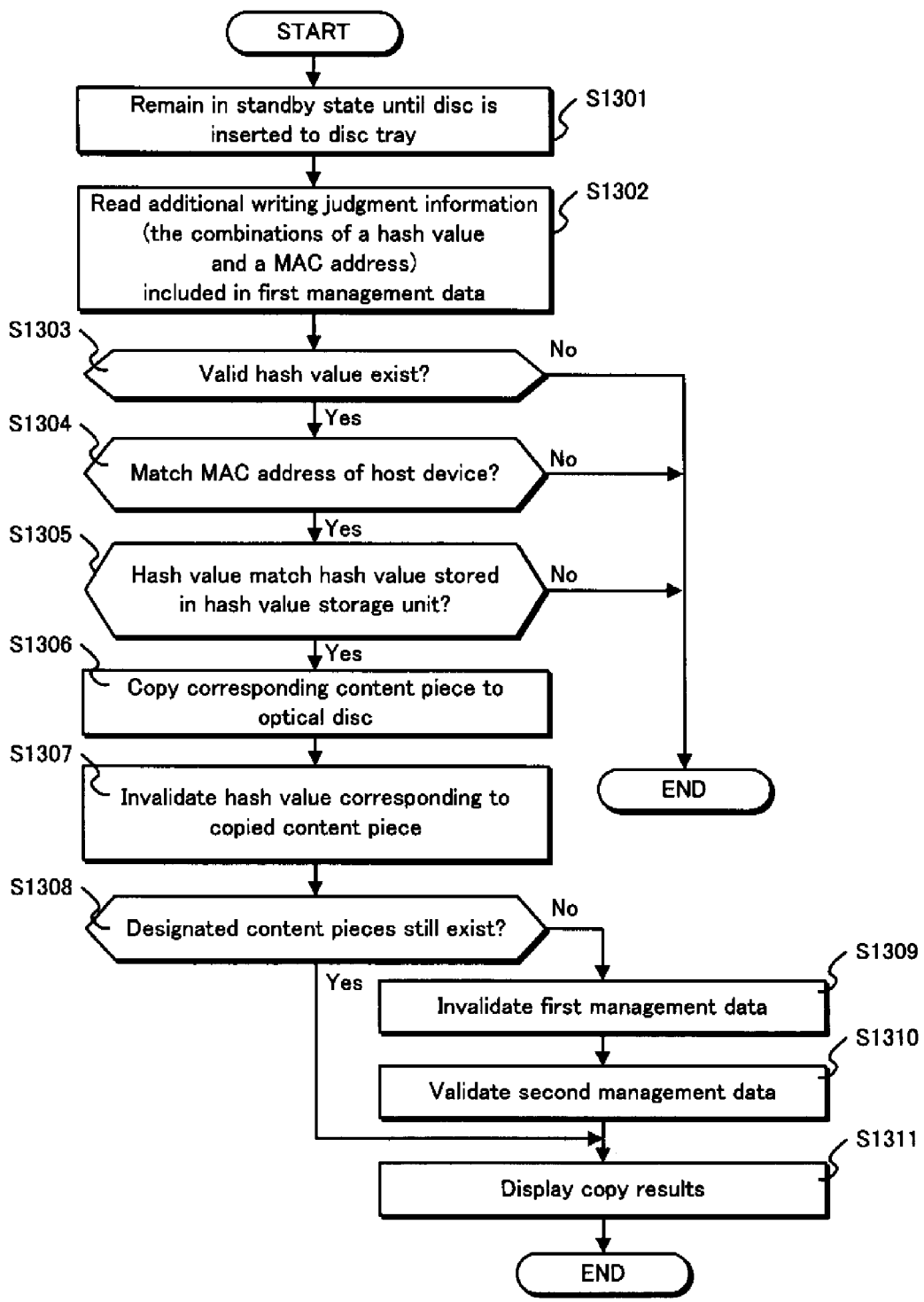
FIG. 13 is a flowchart showing processing performed by an additional writing apparatus.

FIG. 13 is a flowchart showing the procedures involved in processing performed by the additional writing apparatus. Each of the content recording apparatuses 12 though 14 functions as the additional writing apparatus.

The additional writing apparatus remains in standby state until the optical disc 31 is inserted to the disc tray of the optical drive 32 (S1301).

When the optical disc 31 is inserted, the reading unit 212 of the additional writing apparatus reads the additional writing judgment information (the combinations of a hash value and a MAC address) included in the first management data recorded onto the optical disc 31 (S1302).

The operations of subsequent Steps S1303 through S1305 are performed so as to specify designated content pieces which are stored on the additional writing apparatus and which are to be additionally copied to the optical disc 31. Further, the specification of designated content pieces is performed according to the additional writing judgment information included in the first management data of the optical disc 31.

Firstly, the additional writing processing unit 214 determines whether there is a valid hash value among the hash values read from the optical disc 31. When there is a valid hash value (Step S1303: Yes), the additional writing processing unit 214 judges whether the MAC address corresponding to the valid hash value matches the MAC address of the additional writing apparatus (S1304).

When the MAC address corresponding to the valid hash value matches the MAC address of the additional writing apparatus (S1304:Yes), the additional writing processing unit 214 proceeds to judging whether the valid hash value read from the optical disc 31 matches one of the hash values stored in the hash value storage unit 204 (S1305).

If a hash value matching the valid hash value is stored in the hash value storage unit 204 (S1305: Yes), the additional writing processing unit 214 copies a content piece corresponding to the matching hash value to the optical disc 31 (S1306). In consequence, the content piece copied in this step is the content piece based on which the hash value has been generated.

In the following, more detailed description will be made on the operations in Steps S1303 through S1305 based on examples. Here, when assuming that the additional writing judgment information read by the reading unit 212 of the content recording apparatus 12 is additional writing judgment information as depicted in FIG. 7, the additional writing processing unit 214 performs the judgment in S1305 according to the two hash values indicated by "123 . . . " and "890 . . . " among the three hash values. The two hash values as specified above are chosen since the two hash values are stored in association with the MAC address "bb:bb:bb:bb:bb: bb" of the content recording apparatus 12. Further, when the two hash values as specified above are stored in the hash value storage unit 204, the additional writing processing unit 214 judges that episodes 2 and 4 are designated content pieces. This is since episodes 2 and 4 are the content pieces which have been used in the generation of the respective two hash values.

When copying of designated content pieces (S1306) has been completed, the update unit 210 invalidates the hash values stored in the additional writing judgment information of the optical disc 31 which correspond to the content pieces additionally written (S1307).

In addition, the update unit 210 deletes the hash values which correspond to the content pieces additionally written among the entirety of hash value stored in the hash value storage unit 204.

Further, when there is a valid hash value remaining in the additional writing judgment information of the optical disc 31, the update unit 210 judges that there are designated content pieces which have not yet been copied to the optical disc 31 and therefore are to be subsequently copied thereto (S1308: Yes).

In contrast, when all of the hash values included in the additional writing judgment information of the optical disc 31 are invalidated, the update unit 210 judges that all designated content pieces have been written to the optical disc 31 (S1308: No).

In the latter case, the update unit 210 invalidates the first management data (S1309) and in turn validates the second management data (S1310).

When judging that there are designated content piece which have not yet been copied to the optical disc 31 (S1308: Yes), or when the validation of the second management data is completed (S1310), the additional writing processing unit 214 displays a menu screen including copy results to the display device 45 (S1311).

In a case where there are designated content pieces which have not yet been written to the optical disc 31 in Step 1311, the additional writing processing unit 214 displays a list of content recording apparatuses in hold of the designated content pieces which have not yet been written, as depicted in FIG. 12.

On the other hand, in a case where all designated content pieces have been written to the optical disc 31, the additional writing processing unit 214 displays a message indicating that all copying has been completed (undepicted).

EXAMPLE

In the following, description will be made on the procedures involved when copying consecutive episodes 1 through 4 of a TV program onto a single optical disc 31, with reference to the accompanying FIG. 14. The content pieces to be copied, or episodes 1 through 4 in this case, are distributed among the content recording apparatuses 11 through 14.

Hereinafter, description will be made in an order beginning from (1) and finishing at (3) in FIG. 14.

(1) The content recording apparatus 11 receives, from the user A, a designation of content pieces to be copied: episodes 1 through 4 in this case, and a specification of a playback order in which the copied content pieces are to be played back: episode 1→episode 2→episode 3→episode 4 in this case (FIG. 9: S92).

Following receipt of the designation of content pieces to be copied and the specification of the playback order from the user A, the content recording apparatus 11 copies episode 1 (ep1), the first management data, and the second management data, all of which are stored on the content recording apparatus 11, to the inserted optical disc 31 (FIG. 9: S97).

The first management data to be written to the optical disc 31 by the content recording apparatus 11 includes additional writing judgment information, which is constituted of combinations of a hash address and a MAC address. In this case, the hash values included in the additional writing judgment information are: a hash value of episode 3 obtained from the content recording apparatus 13 which holds episode 3; hash values of episodes 2 and 4 obtained from the content recording apparatus 12 which holds episodes 2 and 4. The MAC addresses included in the additional writing judgment information are MAC addresses of each of the content recording apparatuses 13 and 12, by which the hash values have been generated. Further, note that the hash value corresponding to episode 1 which is to be copied to the optical disc 31 by the content recording apparatus 11 is invalidated in the additional writing judgment information.

Here, the second management data to be written to the optical disc 31 by the content recording apparatus 11, while not including the additional writing judgment information, includes a PLAYLIST table which is in accord with the playback order (in this case: episode 1→episode 2→episode 3→episode 4) received by the copy request reception unit 104.

(2) When the optical disc 31 is inserted to the content recording apparatus 12, the content recording apparatus 12 reads the additional writing judgment information from the inserted optical disc 31 (FIG. 13: S1302).

Subsequently, the content recording apparatus 12 performs a judgment of whether a MAC value and a hash value included in the additional writing judgment information correspond to the MAC value held thereby and a hash value stored in the hash value storage unit 204 thereof. In this case, since the MAC address included in the additional writing judgment information matches the MAC address of the content recording apparatus 12 (S1304: Yes), and the hash values of episodes 2 and 4 associated with the MAC address match the hash values stored in the hash value storage unit 204 thereof (S1305: Yes), the content recording apparatus 12 copies episodes 2 and 4 stored thereon to the optical disc 31 (S1306). Further, the content recording apparatus 12 invalidates the hash values corresponding to episodes 2 and 4 (ep 2 and 4) included in the first management data of the optical disc 31 (S1307).

(3) When the optical disc 31 is inserted to the content recording apparatus 13, the content recording apparatus 13 reads the additional writing judgment information from the inserted optical disc 31 (FIG. 13: S1302).

Subsequently, the content recording apparatus 13 performs a judgment of whether a MAC value and a hash value included in the additional writing judgment information correspond to the MAC value held thereby and a hash value stored in the hash value storage unit 204 thereof. In this case, since the MAC address included in the additional writing judgment information matches the MAC address of the content recording apparatus 13 (S1304: Yes), and the hash value of episodes 3 associated with the MAC address matches the hash value stored in the hash value storage unit 204 thereof (S1305: Yes), the content recording apparatus 13 copies episode 3 stored thereon to the optical disc 31 (S1306). Further, the content recording apparatus 13 invalidates the hash value corresponding to episode 3 (ep 3) included in the first management data of the optical disc 31 (S1307).

As a result of the invalidation of the hash value, the content recording apparatus 13 judges that all of the hash values included in the first management data of the optical disc 31 are invalidated (S1308:No). Having made such judgment, the content recording apparatus 13 invalidates the first management data (S1309), and validates the second management data (S1310).

Figure 15:
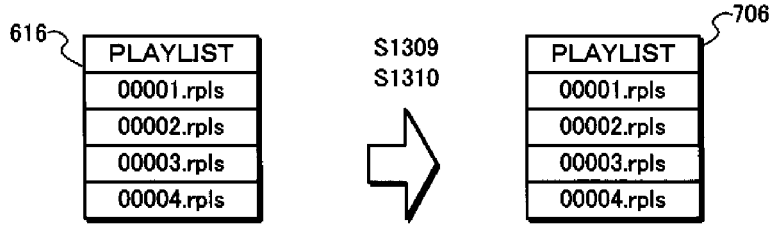
FIG. 15 is a diagram showing the transition of additional writing judgment information included in the first management data and a PLAYLIST table included in the first management data (and finally included in the second management data).

FIG. 15 shows the transition of the additional writing judgment information which is included in the first management data, and the transition of the PLAYLIST table, which is also included in the first management data (and finally included in the second management data).

It should be especially noted here that when the content recording apparatus 13 reads the first management data from the optical disc 31, the PLAYLIST table 616 included therein is in an undesired state. That is, the ".rpls" files included in the PLAYLIST table 616 are arranged in the order of "00001.rpls→00002.rpls→00004.rpls→00003.rpls", which indicates a playback order of "episode 1→episode 2→episode 4→episode 3". This playback order is undesirable, since it differs from the playlist order specified by the user. However, this problem is solved when the first management data is invalidated and replaced by the second management data, following the judgment that all of the hash values included in the first management data of the optical disc 31 are invalidated. Since the second management data being applied as the management data of the optical disc 31 is equivalent to the PLAYLIST table 706 being applied as the management data, the content pieces which have been copied onto the optical disc 31 are played back in the playback order as desired by the user A, which is "episode 1→episode 2→episode 3→episode 4". Furthermore, note that the additional writing judgment information 610 is erased and will be no longer included in the management data of the optical disc 31 when the first management data has been replaced by the second management data.

<Supplement 1>

It will be understood that the above described embodiment of the present invention is merely illustrative of applications of the principles of this invention, and many other embodiments and modifications may be conceived for achieving purposes which are similar or related to those described herein without departing from the spirit and scope of the invention. For instance, several modifications of the present invention are presented in the following.

(1) The editing of designated content before completion of copying thereof to the optical disc 31 may lead to the imperfection of the copying process. For instance, description will be made hereinafter of a case where a designated content piece, namely episode 3, which is stored on the content recording apparatus 13 is edited prior to (2) in FIG. 14 by a user B. Here, the user B is a user different from the user A who has made the copying request. When a designated content piece is edited in such a manner, the metadata of the designated content piece will be altered, which leads to the hash value generated from the designated content piece differing from the previously generated hash value. Thus, even if the optical disc 31 is inserted to the content recording apparatus 13, the episode 3 originally designated as a content piece to be copied when a copy request was made no longer will exist on the content recording apparatus 13, and therefore episode 3 will not be additionally written to the optical disc 31 by the content recording apparatus 13.

In view of such case, it may be conceived to issue a notification to the user indicating that a content piece which has been selected for editing is a designated content piece. By providing the user with such assistance, trouble-free execution of the copy process may be realized.

Figure 16:
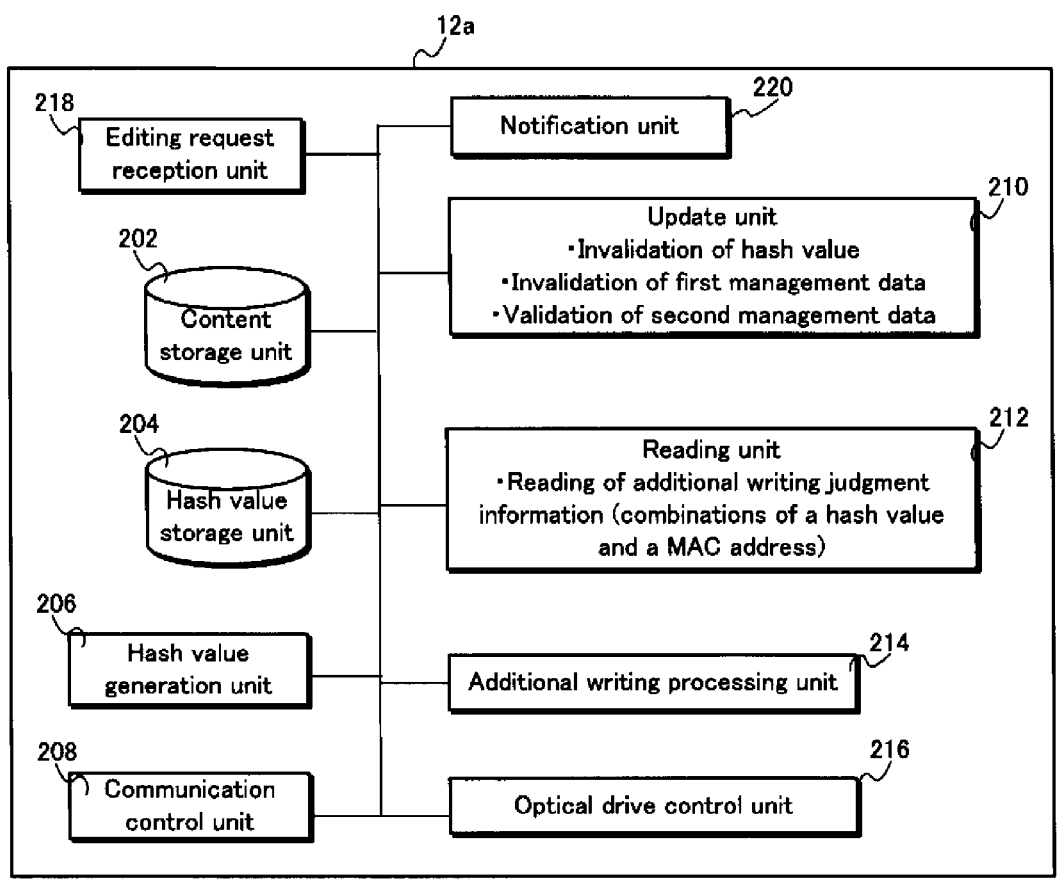

FIG. 16 is a functional block diagram of a content recording apparatus 12a which is a modification of the content recording apparatus 12, modification being made thereto with such cases as described above in consideration. More specifically, the content recording apparatus 12a generally resembles the content recording apparatus 12 illustrated in FIG. 4, except for that an edit request reception unit 218 and a notification unit 220 have been newly added thereto.

The edit request reception unit 218 receives requests made by a user to edit content pieces stored on the content storage unit 202.

Editing as mentioned herein refers to editing and processing performed on contents in general, and includes, for instance, such editing and processing of contents as deletion of playback sections ("cutting"), deletion of an entire content piece, merging of multiple content pieces, encoding of contents and so on.

The notification unit 220 judges whether a content piece whose editing has been requested for through the edit request reception unit 218 is a designated content piece. If a content piece whose editing has been requested for is a designated content piece, the notification unit 220 causes the display device 45 to display a message indicating that the content piece is a designated content piece.

Figure 17:
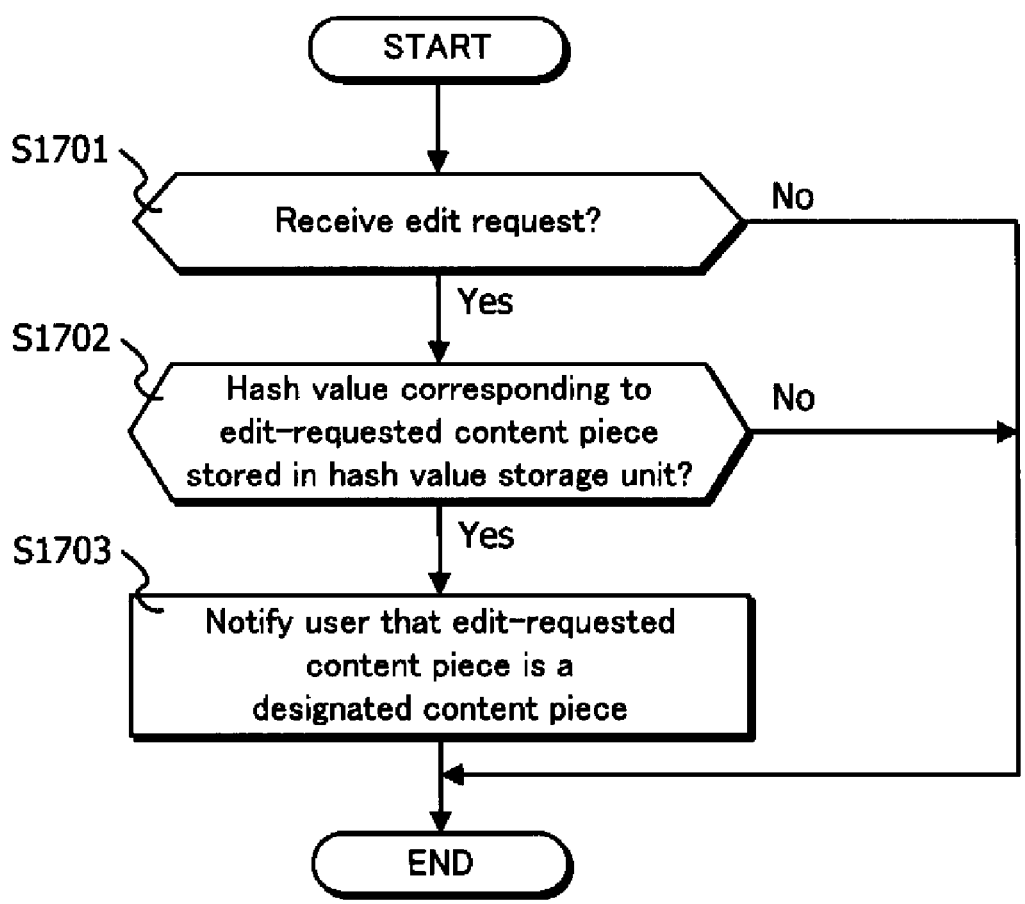
FIG. 17 is a flowchart showing the procedures involved in notifying the user that the designated content is a copy-target content.

FIG. 17 is a flowchart showing the operations involved in notifying the user that a content piece whose editing has been requested for is a designated content piece.

Firstly, when the edit request reception unit 218 receives an edit request (S1701), the notification unit 220 makes a judgment of whether a hash value corresponding to the content piece whose editing has been requested for is stored in the hash value storage unit 204 (S1702).

If the result of the judgment is positive (S1702: Yes), the notification unit 220 causes the display device 45 to display, to the user, a notification indicating that the content piece whose editing has been requested for is a designated content piece (S1703).

Figure 18:
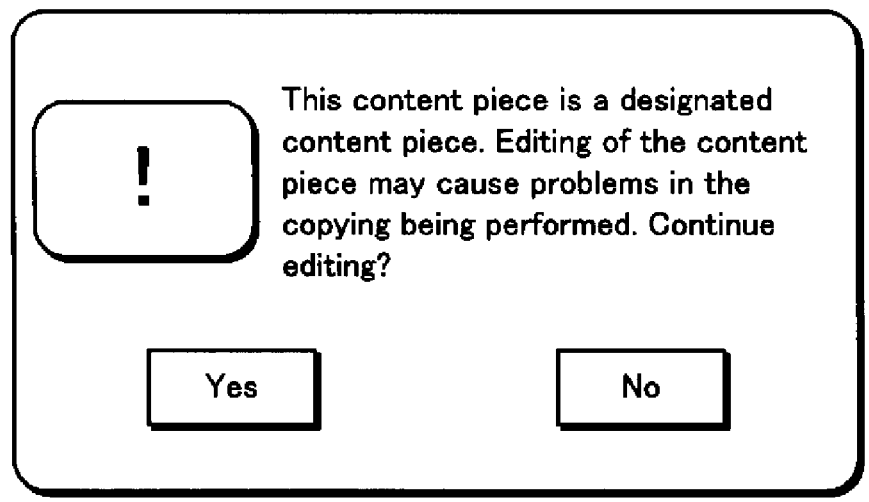
FIG. 18 is a diagram showing an example of a notification made in Step S1703 (FIG. 17).

FIG. 18 shows an example of the notification made in Step S1703 (depicted in FIG. 17).

In the menu screen 82 depicted in FIG. 18, a message is displayed which indicates that the content piece whose editing has been requested for is a designated content piece and that editing of the content piece may cause problems in the copying being executed. More specifically, the message in FIG. 18 reads: "The content piece you have selected is a designated content piece. Editing of a designated content piece may cause errors in the copying being carried out."

The displaying of such message prompts the user B to reconsider editing a designated content piece.

Figure 19:
FIG. 19 is a diagram showing an example of a notification made in Step S1703 (FIG. 17).

Alternatively, it may be conceived to completely prohibit (restrict) editing of designated content pieces via the editing request reception unit 218, while displaying a message such as depicted in menu screen 84 of FIG. 19 to the user. The message displayed on the menu screen 84 reads: "Content is locked!"

Although description has been made with reference to FIGS. 18 and 19 on examples of notification being made to the user by the displaying of messages onto the screen, the present invention is not limited to this. Various means of notification may be applied, as long as the user is notified that he/she is trying to edit a designated content piece. Other means of providing notification to the user may include notification by voice or sound.

(2) In the embodiment of the present invention, description is made that the content recording apparatus 11 (FIG. 3) which serves as the initial writing apparatus and the content recording apparatuses 12 through 14 which serve as the additional writing apparatuses (FIG. 14) differ in structures, but the present invention is not limited to this. The content recording apparatuses 11 through 14 may analogously include the functional blocks as described with reference to FIGS. 3 and 4.

(3) In the embodiment of the present invention, description is made under the assumption that the optical disc 31 is a BD-RE, merely as one example of a removable recording medium applicable to the present invention. However, the present invention is not limited to this, and the media applied to the present invention may be a CD, a DVD or other optical discs.

Furthermore, the media to be used with the present invention is not limited to optical discs, and other forms of recording media such as a memory card may be used as well.

(4) In the embodiment, description is made that "invalidation of management data indicates deletion of management data". However, in a case where a non-rewritable media, such as a BD-R (Readable) is used as the optical disc for the copying of contents, an alternative method of additionally writing information indicating that the first management data is invalid to the disc may be applied to invalidate the first management data.

(5) In the embodiment, description is made that the content recording apparatuses 11 through 14 are provided with such functions similar to those of a common Blu-ray recorder equipped with an HDD. However, the present invention is not limited to this, and it is not required for the content recording apparatuses to have a recorder function, given that the content recording apparatuses are each provided with a storing means for storing contents as well as with a function of writing data to recording media.

In addition, the content recording apparatuses 11 through 14 may also be computer terminals such as PCs and work stations, or mobile terminals such as a GPS navigation device, a PDA, and a mobile phone terminal.

(6) In the embodiment, description is made that the judgment of whether designated content pieces exist on each of the content recording apparatus is made according to a hash value generated by the hash value generation unit 206, but the present invention is not limited to this. It may be conceived to use such other information as content IDs or content names for the same purpose, as long as content pieces can be identified with the use of such information.

However, it should be noted that the use of hash values is exemplary, since editing (or tampering) of copy-target content is detected when hash values are used.

(7) In the embodiment, MAC addresses of each of the content recording apparatuses 11 through 14 are used as information identifying each of the content recording apparatuses. However, the present invention is not limited to this, and other forms of information may be used as identifiers of each of the apparatuses, provided that such information is capable of uniquely identifying each of the apparatuses. For instance, in a network where each of the devices are provided with a fixed identifier (IP addresses or host names, for example), the IP addresses and the host names may be used as identifiers.

(8) In the embodiment, description is made that the additional writing judgment information includes combinations of a hash value and a MAC address as illustrated in FIG. 7, but the present invention is not limited to this. For instance, the additional writing judgment information may be composed of only hash values.

In addition, in the generation of hash values by the hash value generation unit 206, a MAC address of the content recording apparatus including the hash value generation unit 206 may be used as data from which the hash value is generated.

(9) In the embodiment, description is made that the PLAYLIST table, at a point where all copying of content pieces to the optical disc has been completed, is in accord with the playback order specified by the user, by undergoing the invalidation of the first management data and the validation of the second management data (refer to FIG. 13 and Steps S1309 and S1310). However, such processing need not be executed.

For instance, in a case where the designated content pieces are independent, single TV program, which do not compose a series of programs like a drama series, the order in which the content pieces are played back is not essential. In copying such designated content pieces to a recording medium, no inconvenience will be caused even if the invalidation/validation processing as described above is not executed.

Additionally, in Step S92 in FIG. 9, an application of the present invention may be conceived where a specification of playback order is not received from the user. In such case, the management data generation unit 112 (FIG. 3) generates, as management data, only the first management data, and thus the writing processing unit 114 copies only the first management data to the optical disc 31.

Further, there may be cases where the content recording apparatus, used as an initial writing apparatus for receiving copy request, is not provided with a function of storing content pieces thereon (that is, the content recording apparatus may not include the content storage unit 102).

Figure 20:
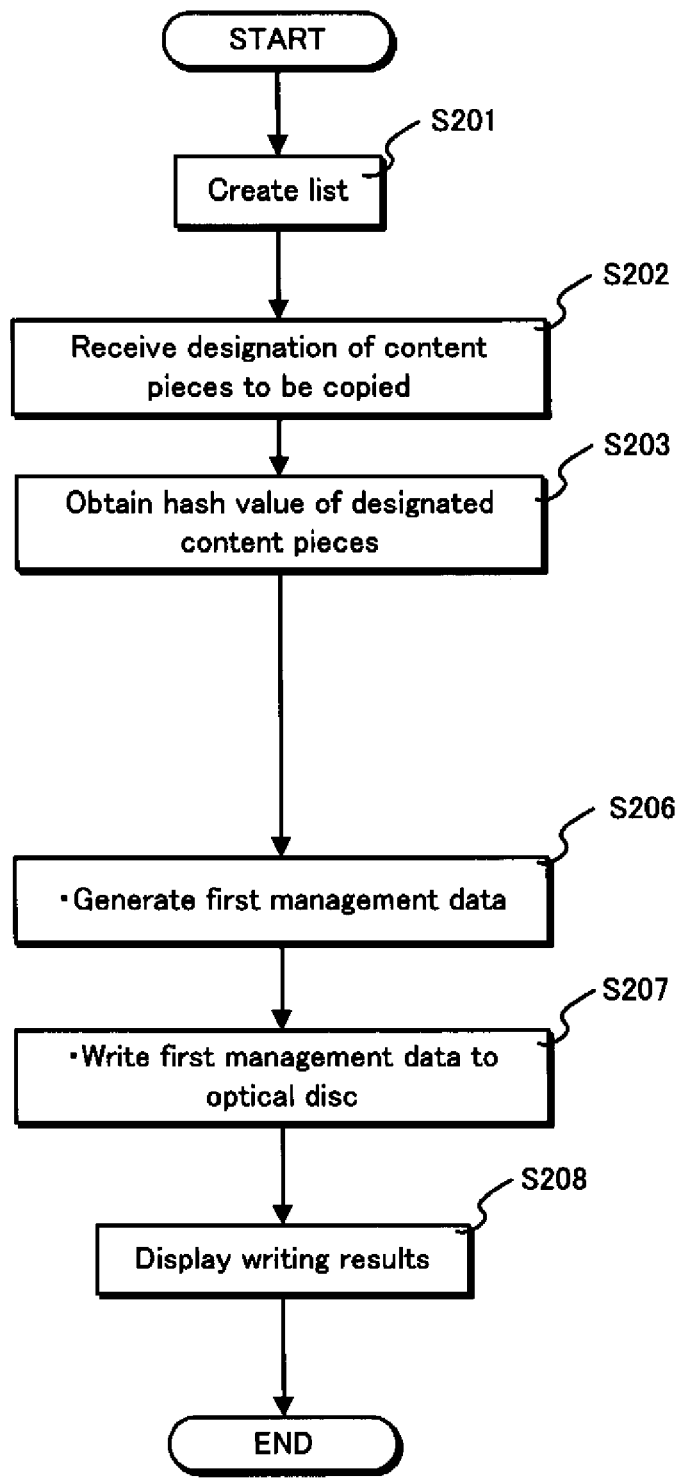
FIG. 20 is a flowchart showing processing performed by the initial writing apparatus.

FIG. 20 is a diagram showing procedures involved in operations of a content recording apparatus which neither receives specifications of a playback order of content pieces nor is provided with the function of storing content pieces thereto. The procedures of Step S201 through 5208 in FIG. 20 resemble those of the procedures of FIG. 9, except that the procedures involved are simplified.

(10) It may be conceived to distribute a control program composed of program code for causing processors of various content recording apparatuses and various circuits connected thereto to execute the operations as description has been made in the embodiment. The distribution of such control program may be realized by recording the control program onto recording media, or transmitting the control program via various communication paths. The recording media which may be used in the distribution of the control program include such non-transitory recording media as IC cards, HDDs, optical discs, flexible disks, ROMs and the like. The distributed control program is to be stored to a processor-readable memory or the like, and accessed by the processor. Thus, each of the functions described in the embodiments is realized.

(11) The content recording apparatus as described in the above embodiment may be typically realized as an LSI (Large Scale Integration), which is a type of an integrated circuit. Further, each of the functions may be separately integrated into a single chip, or the functions may be integrated into a single chip including a part or all of the functions.

Although description has been made on the basis of an LSI in the above, the name of the integrated circuit may differ according to the degree of integration of the chips. Other integrated circuits include an IC (integrated circuit), a system LSI, a super LSI, and an ultra LSI.

Further, the method applied for forming integrated circuits is not limited to the LSI, and the present invention may be realized on a dedicated circuit or a general purpose processor. For example, the present invention may be realized on a FPGA (Field Programmable Gate Array) being an LSI which can be programmed after manufacturing, or a reconfigurable processor being a LSI reconfiguration of which could be made to the connection of internal circuit cells and settings.

Further in addition, if a new technology of circuit integration replacing that of the LSI emerges as a result of the progress made in the field of semiconductor technology or technology deriving therefrom, the integration of function blocks may be performed applying such technology. At this point, there is a possibility of biotechnology being applied to induce the future development of circuit integration technology.

<Supplement 2>

The present invention includes the following aspects.

(1) One aspect of the present invention is a content copying system including a plurality of devices cooperating to copy a content piece to a removable recording medium, the plurality of devices including a first device and a second device, the first device comprising: a creation unit operable to create a content list, the content list being a list of a plurality of content pieces held by the plurality of devices in the content copying system; a reception unit operable to receive, from a user, a designation of at least one content piece to be copied to the removable recoding medium from among the content pieces listed in the content list; an obtaining unit operable to obtain at least one content identifier in one-to-one correspondence with the at least one content piece to be copied from the plurality of devices; and a writing unit operable to write first management data to the removable recording medium, the first management data including the at least one content identifier obtained by the obtaining unit, and the second device comprising: a storing unit operable to store at least one content piece; a generation unit operable to generate at least one content identifier in one-to-one correspondence with the at least one content piece stored in the storing unit; a reading unit operable to read the at least one content identifier included in the first management data from the removable recording medium; a judging unit operable to judge whether the at least one content identifier generated by the generation unit is included in the at least one content identifier read from the removable recording medium; and an additional writing unit operable, when a content identifier generated by the generation unit is included in the at least one content identifier read from the removable recording medium, to copy a content piece corresponding to the content identifier to the removable recording medium.

(2) In the content copying system, the second device may further comprise: an updating unit operable to update, when the additional writing unit has copied the content piece to the removable recording medium, the content identifier corresponding to the content piece such that an updated content identifier indicates completion of the copying; and the judging unit may perform the judgment on the at least one content identifier excluding the updated content identifier.

According to the above structure, since the judgment unit does not perform the judgment on content identifiers indicating completion of the copying, cases are avoided where a same content piece is written to the removable recording medium more than once.

(3) Further, in the content copying system, the reception unit may receive a designation of two or more content pieces to be copied to the removable recording medium and a specification of a playback order in which the two or more content pieces to be copied are to be played back, the writing unit may write, in addition to the first management data according to a prescribed format determined by the type of the removable recording medium, second management data according to a format other than the prescribed format and including the playback order to the removable recording medium, and the updating unit may update the first management data by invalidation thereof and update the second management data by changing the format thereof to the prescribed format, in a case where all of the content identifiers included in the first management data indicate the completion of the copying.

According to the above structure, since the second management data is updated and thus validated when copying has been completed, the playback order of content pieces written to the removable recording medium will be in accord with the playback order received by the copy reception unit.

Furthermore, even in cases where there are multiple devices having similar structures as the second device in the content copying system, the order in which copying of content pieces is performed among the devices will not be of importance, since the playback order is organized to be in accord with the specified playback order as mentioned above.

(4) Additionally, in the content copying system, the first management data may be exclusive of the playback order, and the second management data may be exclusive of the two or more content identifiers in one-to-one correspondence with the two or more content pieces to be copied.

According to the above structure, the content identifiers, which are referred to during the copying of content pieces to the removable recording medium, do not remain on the removable recording medium as valid information when copying has been completed.

(5) Further, in the content copying system, the first management data may include, in addition to the at least one content identifier, at least one device identifier uniquely identifying at least one of the plurality of devices that holds the at least one content piece to be copied, the reading unit may read the at least one device identifier included in the first management data from the removable recording medium, the judging unit may judge whether a device identifier identifying the second device is included in the at least one device identifier read from the removable recording medium, and the additional writing unit, only when the device identifier identifying the second device is included in the at least one device identifier read from the removable recording medium, may copy the at least one content piece in one-to-one correspondence with the at least one device identifier read from the removable recording medium.

By referring to the device identifiers, the accuracy of the judgment made by the second device of whether or not to copy content pieces to the removable recording medium is improved.

(6) Additionally, in the content copying system, the first device may further comprise a storing unit for storing at least one content piece, and when a content piece stored in the storage unit is included in the designation of at least one content piece to be copied to the removable recording medium received by the reception unit, the writing unit may write the content piece stored in the storing unit to the removable recording medium.

(7) Also, in the content copying system of the present invention, each of the at least one content identifier may be a hash value.

(8) Another aspect of the present invention is a content recording apparatus for copying content pieces to a removable recording medium, the content recording apparatus being connected with another device holding one or more content pieces via a network, the content recording apparatus may comprise: a storing unit operable to store one or more content pieces; a creation unit operable to create a content list of both of the one or more content pieces stored in the storing unit and the one or more content pieces held by the other device; a reception unit operable to receive, from a user, a designation of one or more content pieces to be copied to the removable recording medium from among the content pieces listed in the content list; an obtaining unit operable to obtain one or more content identifiers in one-to-one correspondence with the one or more content pieces to be copied; and a writing unit operable to write first management data to the removable recording medium, the first management data including the one or more content identifiers.

(9) In the content recording apparatus, when the designation of one or more content pieces to be copied includes a content piece stored in the storing unit, the writing unit may write the content piece stored in the storing unit to the removable recording medium, and when the designation of one or more content pieces to be copied includes a content piece held by the other device, the obtaining unit may obtain a content identifier in one-to-one correspondence with the content piece held by the other device from the other device, and the writing unit may write the first management data to the recording medium, the first management data including the content identifier in one-to-one correspondence with the content piece held by the other device.

(10) Still another aspect of the present invention is a content recording apparatus for copying content pieces to a removable recording medium, the content recording apparatus being connected with another device holding one or more content pieces via a network, the content recording apparatus may comprise: a storing unit operable to store one or more content pieces; a generation unit operable to generate one or more content identifiers in one-to-one correspondence with the one or more content pieces stored in the storing unit; a reading unit operable to read one or more content identifiers included in first management data stored on the removable recording medium; a judging unit operable to judge whether the one or more content identifiers generated by the generation unit are included in the one or more content identifiers read from the removable recording medium; and a writing unit operable, when a content identifier generated by the generation unit is included in the one or more content identifiers read from the removable recording medium, to copy a content piece corresponding to the content identifier to the removable recording medium.

(11) Additionally, the content recording apparatus may further comprise an updating unit operable to update the first management data by rewriting the content identifier corresponding to the content piece copied to the removable recording medium such that an updated content identifier indicates completion of the copying.

According to the above structure, since the judgment unit does not perform the judgment on content identifiers indicating completion of the copying, cases can be avoided where a same content piece is written to the removable recording medium more than once.

(12) In the content recording apparatus, the removable recording medium may have stored thereon, in addition to the first management data according to a prescribed format determined by the type of the removable recording medium, second management data according to a format other than the prescribed format and including a specification of a playback order in which content pieces copied to the removable recording medium are to be played back; and the updating unit may update the first management data by invalidation thereof and update the second management data by changing the format thereof to the prescribed format, in a case where all of the one or more content identifiers included in the first management data indicate the completion of the copying.

According to the above structure, since the second management data is updated and thus validated when copying has been completed, the playback order of content pieces copied to the removable recording medium will be in accord with the playback order received by the copy reception unit.

Furthermore, even in cases where there are multiple devices having similar structures as the second device in the content copying system, the order in which copying of content pieces is performed among the devices will not be of importance, since the playback order is organized to be in accord with the specified playback order as mentioned above.

(13) In the content recording apparatus, wherein the generation unit generates the one or more content identifiers when receiving a request therefor from the other device, the content recording apparatus may further comprise; a transmission unit operable to transmit the one or more content identifiers generated by the generation unit to the other device; a content identifier storing unit operable to store the one or more content identifiers generated by the generation unit; and an updating unit operable to, when the content piece in one-to-one correspondence with the content identifier generated by the generation unit has been copied to the removable recording medium, delete the content identifier generated by the generation unit from the content identifier storing unit.

(14) Further, the content recording apparatus may further comprise: a content identifier storing unit operable to store the one or more content identifiers generated by the generation unit; and an edit request reception unit operable to receive, from a user, a request to edit a content piece stored in the storing unit; and a notifying unit operable, when the content piece the editing of which has been requested corresponds to one of the one or more content identifiers stored in the content identifier storing unit, to notify the user that the content piece is a content piece to be copied to the removable recording medium.

According to the above structure, the user is notified that the content whose editing has been requested is a designated content piece, and thus is urged to reconsider editing the content piece.

Hence, cases are avoided where copying is disabled due to designated content pieces being edited.

(15) A final aspect of the present invention is a content copying method for copying a content piece to a removable recording medium, the copying performed by cooperation of a plurality of devices, the plurality of devices including a first device and a second device, the content copying method comprising: a creating step, performed by the first device, of creating a content list, the content list being a list of a plurality of content pieces held by the plurality of devices; a receiving step, performed by the first device, of receiving, from a user, a designation of at least one content piece to be copied to the removable recoding medium from among the content pieces listed in the content list; an obtaining step, performed by the first device, of obtaining at least one content identifier in one-to-one correspondence with the at least one content piece to be copied from the plurality of devices; a writing step, performed by the first device, of writing first management data to the removable recording medium, the first management data including the at least one content identifier obtained in the obtaining step; a generating step, performed by the second device, of generating at least one content identifier in one-to-one correspondence with at least one content piece held by the second device; a reading step, performed by the second device, of reading the at least one content identifier included in the first management data from the removable recording medium; a judging step, performed by the second device, of judging whether the at least one content identifier generated in the generating step is included in the at least one content identifier read from the removable recording medium; and an additional writing step, performed by the second device, when a content identifier generated by the generation unit is included in the at least one content identifier read from the removable recording medium, of copying a content piece corresponding to the content identifier to the removable recording medium.

[Industrial Applicability]

The content recording apparatus constituting the content copying system pertaining to the present invention is suitable for use as AV equipment, or more specifically, for use as a hard disk recorder provided with a network function. The content recording apparatus of the present invention is further applicable for use as a computer terminal or a mobile terminal and so on.

[Reference Signs List]

1 Content copying system
11 Content recording apparatus (initial writing apparatus)
12 Content recording apparatus (additional writing apparatus)
12a Content recording apparatus (additional writing apparatus)
13 Content recording apparatus (additional writing apparatus)
14 Content recording apparatus (additional writing apparatus)
31 Optical disc
102 Content storage unit
104 Copy request reception unit
106 List creation unit
110 Obtaining unit
112 Management information generation unit
114 Writing processing unit
202 Content storage unit
204 Hash value storage unit
206 Hash value generation unit
210 Update unit
212 Reading unit
214 Additional writing processing unit
601 First management data
606 Private information
609 Data area (uniquely expandable area)
610 Additional writing judgment information
616 PLAYLIST table
701 Second management data
706 PLAYLIST table

The invention claimed is:
1. A content copying system including a plurality of devices cooperating to copy a content piece to a removable recording medium, the plurality of devices including a first device and a second device, the first device comprising:
- a creation unit operable to create a content list, the content list being a list of a plurality of content pieces held by the plurality of devices in the content copying system;
- a reception unit operable to receive, from a user, a designation of at least one content piece to be copied to the removable recoding medium from among the content pieces listed in the content list;
- an obtaining unit operable to obtain at least one content identifier in one-to-one correspondence with the at least one content piece to be copied from the plurality of devices; and
- a writing unit operable to write first management data to the removable recording medium, the first management data including the at least one content identifier obtained by the obtaining unit, and the second device comprising:
- a storing unit operable to store at least one content piece;
- a generation unit operable to generate at least one content identifier in one-to-one correspondence with the at least one content piece stored in the storing unit;
- a reading unit operable to read the at least one content identifier included in the first management data from the removable recording medium;
- a judging unit operable to judge whether the at least one content identifier generated by the generation unit is included in the at least one content identifier read from the removable recording medium; and
- an additional writing unit operable, when a content identifier generated by the generation unit is included in the at least one content identifier read from the removable recording medium, to copy a content piece corresponding to the content identifier to the removable recording medium.

2. The content copying system of claim 1, wherein the second device further comprises:
- an updating unit operable to update, when the additional writing unit has copied the content piece to the removable recording medium, the content identifier corresponding to the content piece such that an updated content identifier indicates completion of the copying; and
- the judging unit performs the judgment on the at least one content identifier excluding the updated content identifier.

3. The content copying system of claim 2, wherein the reception unit receives a designation of two or more content pieces to be copied to the removable recording medium and a specification of a playback order in which the two or more content pieces to be copied are to be played back, the writing unit writes, in addition to the first management data according to a prescribed format determined by the type of the removable recording medium, second management data according to a format other than the prescribed format and including the playback order to the removable recording medium, and the updating unit updates the first management data by invalidation thereof and updates the second management data by changing the format thereof to the prescribed format, in a case where all of the content identifiers included in the first management data indicate the completion of the copying.

4. The content copying system of claim 3, wherein the first management data is exclusive of the playback order, and the second management data is exclusive of the two or more content identifiers in one-to-one correspondence with the two or more content pieces to be copied.

5. The content copying system of claim 1, wherein the first management data includes, in addition to the at least one content identifier, at least one device identifier uniquely identifying at least one of the plurality of devices that holds the at least one content piece to be copied, the reading unit reads the at least one device identifier included in the first management data from the removable recording medium, the judging unit judges whether a device identifier identifying the second device is included in the at least one device identifier read from the removable recording medium, and the additional writing unit, only when the device identifier identifying the second device is included in the at least one device identifier read from the removable recording medium, copies the at least one content piece in one-to-one correspondence with the at least one device identifier read from the removable recording medium.

6. The content copying system of claim 1, wherein the first device further comprises a storing unit for storing at least one content piece, and when a content piece stored in the storage unit is included in the designation of at least one content piece to be copied to the removable recording medium received by the reception unit, the writing unit writes the content piece stored in the storing unit to the removable recording medium.

7. The content copying system of claim 1, wherein each of the at least one content identifier is a hash value.

8. A content recording apparatus for copying content pieces to a removable recording medium, the content recording apparatus being connected with another device holding one or more content pieces via a network, the content recording apparatus comprising:
- a storing unit operable to store one or more content pieces;
- a creation unit operable to create a content list of both of the one or more content pieces stored in the storing unit and the one or more content pieces held by the other device;
- a reception unit operable to receive, from a user, a designation of one or more content pieces to be copied to the removable recording medium from among the content pieces listed in the content list;
- an obtaining unit operable to obtain one or more content identifiers in one-to-one correspondence with the one or more content pieces to be copied; and
- a writing unit operable to write first management data to the removable recording medium, the first management data including the one or more content identifiers.

9. The content recording apparatus of claim 8, wherein when the designation of one or more content pieces to be copied includes a content piece stored in the storing unit, the writing unit writes the content piece stored in the storing unit to the removable recording medium, and when the designation of one or more content pieces to be copied includes a content piece held by the other device, the obtaining unit obtains a content identifier in one-to-one correspondence with the content piece held by the other device from the other device, and the writing unit writes the first management data to the recording medium, the first management data including the content identifier in one-to-one correspondence with the content piece held by the other device.

10. A content recording apparatus for copying content pieces to a removable recording medium, the content recording apparatus being connected with another device holding one or more content pieces via a network, the content recording apparatus comprising:
a storing unit operable to store one or more content pieces;
a generation unit operable to generate one or more content identifiers in one-to-one correspondence with the one or more content pieces stored in the storing unit;
a reading unit operable to read one or more content identifiers included in first management data stored on the removable recording medium;
a judging unit operable to judge whether the one or more content identifiers generated by the generation unit are included in the one or more content identifiers read from the removable recording medium; and
a writing unit operable, when a content identifier generated by the generation unit is included in the one or more content identifiers read from the removable recording medium, to copy a content piece corresponding to the content identifier to the removable recording medium.

11. The content recording apparatus of claim 10 further comprising:
an updating unit operable to update the first management data by rewriting the content identifier corresponding to the content piece copied to the removable recording medium such that an updated content identifier indicates completion of the copying.

12. The content recording apparatus of claim 11, wherein
the removable recording medium has stored thereon, in addition to the first management data according to a prescribed format determined by the type of the removable recording medium, second management data according to a format other than the prescribed format and including a specification of a playback order in which content pieces copied to the removable recording medium are to be played back; and
the updating unit updates the first management data by invalidation thereof and updates the second management data by changing the format thereof to the prescribed format, in a case where all of the one or more content identifiers included in the first management data indicate the completion of the copying.

13. The content recording apparatus of claim 10, wherein the generation unit generates the one or more content identifiers when receiving a request therefor from the other device, the content recording apparatus further comprising;
a transmission unit operable to transmit the one or more content identifiers generated by the generation unit to the other device;
a content identifier storing unit operable to store the one or more content identifiers generated by the generation unit; and
an updating unit operable to, when the content piece in one-to-one correspondence with the content identifier generated by the generation unit has been copied to the removable recording medium, delete the content identifier generated by the generation unit from the content identifier storing unit.

14. The content recording apparatus of claim 10 further comprising:
a content identifier storing unit operable to store the one or more content identifiers generated by the generation unit; and
an edit request reception unit operable to receive, from a user, a request to edit a content piece stored in the storing unit; and
a notifying unit operable, when the content piece the editing of which has been requested corresponds to one of the one or more content identifiers stored in the content identifier storing unit, to notify the user that the content piece is a content piece to be copied to the removable recording medium.

15. A content copying method for copying a content piece to a removable recording medium, the copying performed by cooperation of a plurality of devices, the plurality of devices including a first device and a second device, the content copying method comprising:
a creating step, performed by the first device, of creating a content list, the content list being a list of a plurality of content pieces held by the plurality of devices;
a receiving step, performed by the first device, of receiving, from a user, a designation of at least one content piece to be copied to the removable recoding medium from among the content pieces listed in the content list;
an obtaining step, performed by the first device, of obtaining at least one content identifier in one-to-one correspondence with the at least one content piece to be copied from the plurality of devices;
a writing step, performed by the first device, of writing first management data to the removable recording medium, the first management data including the at least one content identifier obtained in the obtaining step;
a generating step, performed by the second device, of generating at least one content identifier in one-to-one correspondence with at least one content piece held by the second device;
a reading step, performed by the second device, of reading the at least one content identifier included in the first management data from the removable recording medium;
a judging step, performed by the second device, of judging whether the at least one content identifier generated in the generating step is included in the at least one content identifier read from the removable recording medium; and
an additional writing step, performed by the second device, when a content identifier generated by the generation unit is included in the at least one content identifier read from the removable recording medium, of copying a content piece corresponding to the content identifier to the removable recording medium.

* * * * *